United States Patent
Staniford et al.

(10) Patent No.: US 9,118,715 B2
(45) Date of Patent: *Aug. 25, 2015

(54) SYSTEMS AND METHODS FOR DETECTING MALICIOUS PDF NETWORK CONTENT

(75) Inventors: Stuart Gresley Staniford, Freeville, NY (US); Ashar Aziz, Fremont, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/469,046

(22) Filed: May 10, 2012

(65) Prior Publication Data

US 2012/0222121 A1 Aug. 30, 2012

Related U.S. Application Data

(63) Continuation of application No. 13/011,344, filed on Jan. 21, 2011, which is a continuation-in-part of application No. 12/263,971, filed on Nov. 3, 2008.

(51) Int. Cl.
*H04L 29/06* (2006.01)
*G06F 21/56* (2013.01)

(52) U.S. Cl.
CPC ............ *H04L 63/145* (2013.01); *G06F 21/562* (2013.01); *G06F 21/566* (2013.01); *H04L 63/1408* (2013.01); *H04L 63/1416* (2013.01); *H04L 2463/144* (2013.01)

(58) Field of Classification Search
CPC . G06F 21/562; G06F 21/566; H04L 63/1408; H04L 63/145
USPC .................. 713/187, 188; 726/22, 23, 24, 25
See application file for complete search history.

(56) References Cited

U.S. PATENT DOCUMENTS

| | | | |
|---|---|---|---|
| 4,292,580 A | 9/1981 | Ott et al. |
| 5,175,732 A | 12/1992 | Hendel et al. |
| 5,440,723 A | 8/1995 | Arnold et al. |
| 5,490,249 A | 2/1996 | Miller |
| 5,537,540 A | 7/1996 | Miller et al. |
| 5,603,027 A | 2/1997 | Ohkami |

(Continued)

FOREIGN PATENT DOCUMENTS

| | | |
|---|---|---|
| GB | 2439806 | 1/2008 |
| GB | 2490431 | 10/2012 |

(Continued)

OTHER PUBLICATIONS

Adobe Systems Incorporated, "PDF 32000-1:2008, Document management—Portable document format—Part 1: PDF 1.7", First Edition, Jul. 1, 2008, 756 pages.*

(Continued)

*Primary Examiner* — Victor Lesniewski

(57) ABSTRACT

Systems and methods for detecting malicious PDF network content are provided herein. According to some embodiments, the methods may include at least the steps of examining received PDF network content to determine if one or more suspicious characteristics indicative of malicious network content are included in the PDF network content, providing PDF network content determined to include at least one suspicious characteristic to one or more virtual machines, and analyzing responses received from the one or more virtual machines to verify the inclusion of malicious network content in the PDF network content determined to include at least one suspicious characteristic.

53 Claims, 7 Drawing Sheets

(56) References Cited

U.S. PATENT DOCUMENTS

| | | | |
|---|---|---|---|
| 5,657,473 A | 8/1997 | Killean et al. | |
| 5,842,002 A | 11/1998 | Schnurer et al. | |
| 5,978,917 A | 11/1999 | Chi | |
| 6,088,803 A | 7/2000 | Tso et al. | |
| 6,094,677 A | 7/2000 | Capek et al. | |
| 6,108,799 A | 8/2000 | Boulay et al. | |
| 6,269,330 B1 | 7/2001 | Cidon et al. | |
| 6,279,113 B1 | 8/2001 | Vaidya | |
| 6,298,445 B1 | 10/2001 | Shostack et al. | |
| 6,357,008 B1 | 3/2002 | Nachenberg | |
| 6,424,627 B1 | 7/2002 | Sørhaug et al. | |
| 6,442,696 B1 | 8/2002 | Wray et al. | |
| 6,484,315 B1 | 11/2002 | Ziese | |
| 6,487,666 B1 | 11/2002 | Shanklin et al. | |
| 6,493,756 B1 | 12/2002 | O'Brien et al. | |
| 6,550,012 B1 | 4/2003 | Villa et al. | |
| 6,775,657 B1 | 8/2004 | Baker | |
| 6,832,367 B1 | 12/2004 | Choi et al. | |
| 6,895,550 B2 * | 5/2005 | Kanchirayappa et al. | 715/229 |
| 6,898,632 B2 | 5/2005 | Gordy et al. | |
| 6,907,396 B1 | 6/2005 | Muttik et al. | |
| 6,971,097 B1 | 11/2005 | Wallman | |
| 6,981,279 B1 | 12/2005 | Arnold et al. | |
| 7,007,107 B1 | 2/2006 | Ivchenko et al. | |
| 7,028,179 B2 | 4/2006 | Anderson et al. | |
| 7,043,757 B2 | 5/2006 | Hoefelmeyer et al. | |
| 7,069,316 B1 | 6/2006 | Gryaznov | |
| 7,080,408 B1 | 7/2006 | Pak et al. | |
| 7,093,002 B2 | 8/2006 | Wolff et al. | |
| 7,093,239 B1 | 8/2006 | van der Made | |
| 7,100,201 B2 | 8/2006 | Izatt | |
| 7,159,149 B2 | 1/2007 | Spiegel et al. | |
| 7,231,667 B2 | 6/2007 | Jordan | |
| 7,240,364 B1 | 7/2007 | Branscomb et al. | |
| 7,240,368 B1 | 7/2007 | Roesch et al. | |
| 7,251,215 B1 | 7/2007 | Turner et al. | |
| 7,287,278 B2 | 10/2007 | Liang | |
| 7,308,716 B2 | 12/2007 | Danford et al. | |
| 7,328,453 B2 | 2/2008 | Merkle, Jr. et al. | |
| 7,346,486 B2 | 3/2008 | Ivancic et al. | |
| 7,356,736 B2 | 4/2008 | Natvig | |
| 7,386,888 B2 | 6/2008 | Liang et al. | |
| 7,392,542 B2 | 6/2008 | Bucher | |
| 7,418,729 B2 | 8/2008 | Szor | |
| 7,428,300 B1 | 9/2008 | Drew et al. | |
| 7,441,272 B2 | 10/2008 | Durham et al. | |
| 7,448,084 B1 | 11/2008 | Apap et al. | |
| 7,458,098 B2 | 11/2008 | Judge et al. | |
| 7,464,404 B2 | 12/2008 | Carpenter et al. | |
| 7,464,407 B2 | 12/2008 | Nakae et al. | |
| 7,467,408 B1 | 12/2008 | O'Toole, Jr. | |
| 7,478,428 B1 | 1/2009 | Thomlinson | |
| 7,480,773 B1 | 1/2009 | Reed | |
| 7,487,543 B2 | 2/2009 | Arnold et al. | |
| 7,496,960 B1 | 2/2009 | Chen et al. | |
| 7,496,961 B2 | 2/2009 | Zimmer et al. | |
| 7,516,488 B1 | 4/2009 | Kienzle et al. | |
| 7,519,990 B1 | 4/2009 | Xie | |
| 7,523,493 B2 | 4/2009 | Liang et al. | |
| 7,530,104 B1 | 5/2009 | Thrower et al. | |
| 7,540,025 B2 | 5/2009 | Tzadikario | |
| 7,565,550 B2 | 7/2009 | Liang et al. | |
| 7,568,233 B1 | 7/2009 | Szor et al. | |
| 7,584,455 B2 | 9/2009 | Ball | |
| 7,603,715 B2 | 10/2009 | Costa et al. | |
| 7,639,714 B2 | 12/2009 | Stolfo et al. | |
| 7,644,441 B2 | 1/2010 | Schmid et al. | |
| 7,657,419 B2 | 2/2010 | van der Made | |
| 7,676,841 B2 | 3/2010 | Sobchuk et al. | |
| 7,698,548 B2 | 4/2010 | Shelest et al. | |
| 7,707,633 B2 | 4/2010 | Danford et al. | |
| 7,712,136 B2 * | 5/2010 | Sprosts et al. | 726/24 |
| 7,730,011 B1 * | 6/2010 | Deninger et al. | 707/602 |
| 7,739,740 B1 | 6/2010 | Nachenberg et al. | |
| 7,779,463 B2 | 8/2010 | Stolfo et al. | |
| 7,784,097 B1 | 8/2010 | Stolfo et al. | |
| 7,832,008 B1 | 11/2010 | Kraemer | |
| 7,836,502 B1 | 11/2010 | Zhao et al. | |
| 7,849,506 B1 | 12/2010 | Dansey et al. | |
| 7,854,007 B2 * | 12/2010 | Sprosts et al. | 726/24 |
| 7,869,073 B2 | 1/2011 | Oshima | |
| 7,877,803 B2 | 1/2011 | Enstone et al. | |
| 7,904,959 B2 | 3/2011 | Sidiroglou et al. | |
| 7,908,660 B2 | 3/2011 | Bahl | |
| 7,930,738 B1 * | 4/2011 | Petersen | 726/16 |
| 7,937,761 B1 | 5/2011 | Benett | |
| 7,949,849 B2 * | 5/2011 | Lowe et al. | 711/173 |
| 7,996,556 B2 | 8/2011 | Raghavan et al. | |
| 7,996,836 B1 | 8/2011 | McCorkendale et al. | |
| 7,996,904 B1 | 8/2011 | Chiueh et al. | |
| 7,996,905 B2 | 8/2011 | Arnold et al. | |
| 8,006,305 B2 | 8/2011 | Aziz | |
| 8,010,667 B2 | 8/2011 | Zhang et al. | |
| 8,020,206 B2 | 9/2011 | Hubbard et al. | |
| 8,028,338 B1 | 9/2011 | Schneider et al. | |
| 8,042,184 B1 | 10/2011 | Batenin | |
| 8,045,094 B2 | 10/2011 | Teragawa | |
| 8,045,458 B2 | 10/2011 | Alperovitch et al. | |
| 8,069,484 B2 | 11/2011 | McMillan et al. | |
| 8,087,086 B1 | 12/2011 | Lai et al. | |
| 8,171,553 B2 | 5/2012 | Aziz et al. | |
| 8,176,049 B2 * | 5/2012 | Deninger et al. | 707/736 |
| 8,201,246 B1 | 6/2012 | Wu et al. | |
| 8,204,984 B1 | 6/2012 | Aziz et al. | |
| 8,214,905 B1 | 7/2012 | Doukhvalov et al. | |
| 8,220,055 B1 | 7/2012 | Kennedy | |
| 8,225,288 B2 | 7/2012 | Miller et al. | |
| 8,225,373 B2 | 7/2012 | Kraemer et al. | |
| 8,233,882 B2 | 7/2012 | Rogel | |
| 8,234,640 B1 | 7/2012 | Fitzgerald et al. | |
| 8,234,709 B2 | 7/2012 | Viljoen et al. | |
| 8,239,944 B1 | 8/2012 | Nachenberg et al. | |
| 8,260,914 B1 | 9/2012 | Ranjan | |
| 8,266,091 B1 | 9/2012 | Gubin et al. | |
| 8,286,251 B2 | 10/2012 | Eker et al. | |
| 8,291,499 B2 | 10/2012 | Aziz et al. | |
| 8,307,435 B1 * | 11/2012 | Mann et al. | 726/22 |
| 8,307,443 B2 | 11/2012 | Wang et al. | |
| 8,312,545 B2 | 11/2012 | Tuvell et al. | |
| 8,321,936 B1 | 11/2012 | Green et al. | |
| 8,321,941 B2 | 11/2012 | Tuvell et al. | |
| 8,332,571 B1 | 12/2012 | Edwards, Sr. | |
| 8,365,286 B2 | 1/2013 | Poston | |
| 8,365,297 B1 | 1/2013 | Parshin et al. | |
| 8,370,938 B1 * | 2/2013 | Daswani et al. | 726/23 |
| 8,370,939 B2 * | 2/2013 | Zaitsev et al. | 726/23 |
| 8,375,444 B2 | 2/2013 | Aziz et al. | |
| 8,381,299 B2 * | 2/2013 | Stolfo et al. | 726/24 |
| 8,402,529 B1 | 3/2013 | Green et al. | |
| 8,464,340 B2 | 6/2013 | Ahn et al. | |
| 8,479,174 B2 | 7/2013 | Chiriac | |
| 8,479,276 B1 | 7/2013 | Vaystikh et al. | |
| 8,479,291 B1 | 7/2013 | Bodke | |
| 8,510,827 B1 | 8/2013 | Leake et al. | |
| 8,510,828 B1 | 8/2013 | Guo et al. | |
| 8,510,842 B2 | 8/2013 | Amit et al. | |
| 8,516,478 B1 | 8/2013 | Edwards et al. | |
| 8,516,590 B1 | 8/2013 | Ranadive et al. | |
| 8,516,593 B2 | 8/2013 | Aziz | |
| 8,522,348 B2 | 8/2013 | Chen et al. | |
| 8,528,086 B1 | 9/2013 | Aziz | |
| 8,533,824 B2 * | 9/2013 | Hutton et al. | 726/22 |
| 8,539,582 B1 | 9/2013 | Aziz et al. | |
| 8,549,638 B2 | 10/2013 | Aziz | |
| 8,555,391 B1 | 10/2013 | Demir et al. | |
| 8,561,177 B1 | 10/2013 | Aziz et al. | |
| 8,566,946 B1 | 10/2013 | Aziz et al. | |
| 8,584,094 B2 | 11/2013 | Dadhia et al. | |
| 8,584,234 B1 * | 11/2013 | Sobel et al. | 726/22 |
| 8,584,239 B2 | 11/2013 | Aziz et al. | |
| 8,595,834 B2 | 11/2013 | Xie et al. | |
| 8,627,476 B1 * | 1/2014 | Satish et al. | 726/24 |
| 8,635,696 B1 | 1/2014 | Aziz | |
| 8,682,812 B1 | 3/2014 | Ranjan | |

(56) References Cited

U.S. PATENT DOCUMENTS

| | | | |
|---|---|---|---|
| 8,695,096 B1 | 4/2014 | Zhang | |
| 8,726,392 B1 | 5/2014 | McCorkendale et al. | |
| 8,789,172 B2* | 7/2014 | Stolfo et al. | 726/22 |
| 8,789,178 B2* | 7/2014 | Kejriwal et al. | 726/22 |
| 8,850,570 B1 | 9/2014 | Ramzan | |
| 8,850,571 B2 | 9/2014 | Staniford et al. | |
| 2001/0005889 A1 | 6/2001 | Albrecht | |
| 2001/0047326 A1 | 11/2001 | Broadbent et al. | |
| 2002/0018903 A1 | 2/2002 | Kokubo et al. | |
| 2002/0038430 A1 | 3/2002 | Edwards et al. | |
| 2002/0091819 A1 | 7/2002 | Melchione et al. | |
| 2002/0144156 A1 | 10/2002 | Copeland, III | |
| 2002/0162015 A1 | 10/2002 | Tang | |
| 2002/0166063 A1 | 11/2002 | Lachman et al. | |
| 2002/0169952 A1 | 11/2002 | DiSanto et al. | |
| 2002/0184528 A1 | 12/2002 | Shevenell et al. | |
| 2002/0188887 A1 | 12/2002 | Largman et al. | |
| 2002/0194490 A1 | 12/2002 | Halperin et al. | |
| 2003/0074578 A1 | 4/2003 | Ford et al. | |
| 2003/0084318 A1 | 5/2003 | Schertz | |
| 2003/0115483 A1 | 6/2003 | Liang | |
| 2003/0188190 A1 | 10/2003 | Aaron et al. | |
| 2003/0200460 A1 | 10/2003 | Morota et al. | |
| 2003/0212902 A1 | 11/2003 | Van Der Made | |
| 2003/0229801 A1 | 12/2003 | Kouznetsov et al. | |
| 2003/0237000 A1 | 12/2003 | Denton et al. | |
| 2004/0003323 A1 | 1/2004 | Bennett et al. | |
| 2004/0015712 A1 | 1/2004 | Szor | |
| 2004/0019832 A1 | 1/2004 | Arnold et al. | |
| 2004/0047356 A1 | 3/2004 | Bauer | |
| 2004/0083408 A1 | 4/2004 | Spiegel et al. | |
| 2004/0093513 A1 | 5/2004 | Cantrell et al. | |
| 2004/0111531 A1 | 6/2004 | Staniford et al. | |
| 2004/0128355 A1 | 7/2004 | Chao et al. | |
| 2004/0165588 A1 | 8/2004 | Pandya | |
| 2004/0236963 A1 | 11/2004 | Danford et al. | |
| 2004/0243349 A1 | 12/2004 | Greifeneder et al. | |
| 2004/0249911 A1 | 12/2004 | Alkhatib et al. | |
| 2004/0255161 A1 | 12/2004 | Cavanaugh | |
| 2004/0268147 A1 | 12/2004 | Wiederin et al. | |
| 2005/0021740 A1 | 1/2005 | Bar et al. | |
| 2005/0033960 A1 | 2/2005 | Vialen et al. | |
| 2005/0033989 A1 | 2/2005 | Poletto et al. | |
| 2005/0050148 A1 | 3/2005 | Mohammadioun et al. | |
| 2005/0086523 A1 | 4/2005 | Zimmer et al. | |
| 2005/0091513 A1 | 4/2005 | Mitomo et al. | |
| 2005/0091533 A1 | 4/2005 | Omote et al. | |
| 2005/0091652 A1 | 4/2005 | Ross et al. | |
| 2005/0108562 A1 | 5/2005 | Khazan et al. | |
| 2005/0114663 A1 | 5/2005 | Cornell et al. | |
| 2005/0125195 A1 | 6/2005 | Brendel | |
| 2005/0149726 A1 | 7/2005 | Joshi et al. | |
| 2005/0157662 A1 | 7/2005 | Bingham et al. | |
| 2005/0183143 A1 | 8/2005 | Anderholm et al. | |
| 2005/0201297 A1 | 9/2005 | Peikari | |
| 2005/0210533 A1 | 9/2005 | Copeland et al. | |
| 2005/0238005 A1 | 10/2005 | Chen et al. | |
| 2005/0240781 A1 | 10/2005 | Gassoway | |
| 2005/0265331 A1 | 12/2005 | Stolfo | |
| 2005/0283839 A1 | 12/2005 | Cowburn | |
| 2006/0010495 A1 | 1/2006 | Cohen et al. | |
| 2006/0015715 A1 | 1/2006 | Anderson | |
| 2006/0015747 A1 | 1/2006 | Van de Ven | |
| 2006/0021029 A1 | 1/2006 | Brickell et al. | |
| 2006/0021054 A1 | 1/2006 | Costa et al. | |
| 2006/0031476 A1 | 2/2006 | Mathes et al. | |
| 2006/0047665 A1 | 3/2006 | Neil | |
| 2006/0070130 A1 | 3/2006 | Costea et al. | |
| 2006/0075496 A1 | 4/2006 | Carpenter et al. | |
| 2006/0095968 A1 | 5/2006 | Portolani et al. | |
| 2006/0101516 A1 | 5/2006 | Sudaharan et al. | |
| 2006/0101517 A1 | 5/2006 | Banzhof et al. | |
| 2006/0117385 A1 | 6/2006 | Mester et al. | |
| 2006/0123477 A1 | 6/2006 | Raghavan et al. | |
| 2006/0143709 A1 | 6/2006 | Brooks et al. | |
| 2006/0150249 A1 | 7/2006 | Gassen et al. | |
| 2006/0161983 A1 | 7/2006 | Cothrell et al. | |
| 2006/0161987 A1 | 7/2006 | Levy-Yurista | |
| 2006/0161989 A1 | 7/2006 | Reshef et al. | |
| 2006/0164199 A1 | 7/2006 | Gilde et al. | |
| 2006/0173992 A1 | 8/2006 | Weber et al. | |
| 2006/0179147 A1 | 8/2006 | Tran et al. | |
| 2006/0184632 A1 | 8/2006 | Marino et al. | |
| 2006/0191010 A1 | 8/2006 | Benjamin | |
| 2006/0221956 A1 | 10/2006 | Narayan et al. | |
| 2006/0236393 A1 | 10/2006 | Kramer et al. | |
| 2006/0242709 A1 | 10/2006 | Seinfeld et al. | |
| 2006/0248519 A1 | 11/2006 | Jaeger et al. | |
| 2006/0251104 A1 | 11/2006 | Koga | |
| 2006/0288417 A1 | 12/2006 | Bookbinder et al. | |
| 2007/0006288 A1 | 1/2007 | Mayfield et al. | |
| 2007/0006313 A1 | 1/2007 | Porras et al. | |
| 2007/0011174 A1 | 1/2007 | Takaragi et al. | |
| 2007/0016951 A1 | 1/2007 | Piccard et al. | |
| 2007/0033645 A1 | 2/2007 | Jones | |
| 2007/0038943 A1 | 2/2007 | FitzGerald et al. | |
| 2007/0064689 A1 | 3/2007 | Shin et al. | |
| 2007/0094730 A1 | 4/2007 | Bhikkaji et al. | |
| 2007/0101435 A1 | 5/2007 | Konanka et al. | |
| 2007/0143827 A1 | 6/2007 | Nicodemus et al. | |
| 2007/0156895 A1 | 7/2007 | Vuong | |
| 2007/0157180 A1 | 7/2007 | Tillmann et al. | |
| 2007/0157306 A1 | 7/2007 | Elrod et al. | |
| 2007/0168988 A1 | 7/2007 | Eisner et al. | |
| 2007/0171824 A1 | 7/2007 | Ruello et al. | |
| 2007/0174915 A1 | 7/2007 | Gribble et al. | |
| 2007/0192500 A1 | 8/2007 | Lum | |
| 2007/0192858 A1 | 8/2007 | Lum | |
| 2007/0198275 A1 | 8/2007 | Malden et al. | |
| 2007/0208822 A1 | 9/2007 | Wang et al. | |
| 2007/0220607 A1* | 9/2007 | Sprosts et al. | 726/24 |
| 2007/0240218 A1 | 10/2007 | Tuvell et al. | |
| 2007/0240219 A1 | 10/2007 | Tuvell et al. | |
| 2007/0240220 A1 | 10/2007 | Tuvell et al. | |
| 2007/0240222 A1 | 10/2007 | Tuvell et al. | |
| 2007/0250930 A1 | 10/2007 | Aziz et al. | |
| 2007/0271446 A1* | 11/2007 | Nakamura | 712/226 |
| 2008/0005782 A1 | 1/2008 | Aziz | |
| 2008/0028463 A1 | 1/2008 | Dagon et al. | |
| 2008/0040710 A1 | 2/2008 | Chiriac | |
| 2008/0072326 A1 | 3/2008 | Danford et al. | |
| 2008/0080518 A1 | 4/2008 | Hoeflin et al. | |
| 2008/0086720 A1 | 4/2008 | Lekel | |
| 2008/0098476 A1 | 4/2008 | Syversen | |
| 2008/0120722 A1 | 5/2008 | Sima et al. | |
| 2008/0134178 A1 | 6/2008 | Fitzgerald et al. | |
| 2008/0134334 A1 | 6/2008 | Kim et al. | |
| 2008/0141376 A1 | 6/2008 | Clausen et al. | |
| 2008/0184373 A1 | 7/2008 | Traut et al. | |
| 2008/0201778 A1 | 8/2008 | Guo et al. | |
| 2008/0209557 A1 | 8/2008 | Herley et al. | |
| 2008/0215742 A1 | 9/2008 | Goldszmidt et al. | |
| 2008/0222728 A1 | 9/2008 | Chavez et al. | |
| 2008/0222729 A1 | 9/2008 | Chen et al. | |
| 2008/0263665 A1 | 10/2008 | Ma et al. | |
| 2008/0295172 A1 | 11/2008 | Bohacek | |
| 2008/0301810 A1 | 12/2008 | Lehane et al. | |
| 2008/0313738 A1 | 12/2008 | Enderby | |
| 2008/0320594 A1 | 12/2008 | Jiang | |
| 2009/0007100 A1 | 1/2009 | Field et al. | |
| 2009/0013408 A1* | 1/2009 | Schipka | 726/24 |
| 2009/0031423 A1 | 1/2009 | Liu et al. | |
| 2009/0036111 A1 | 2/2009 | Danford et al. | |
| 2009/0037835 A1 | 2/2009 | Goldman | |
| 2009/0044024 A1 | 2/2009 | Oberheide et al. | |
| 2009/0044274 A1 | 2/2009 | Budko et al. | |
| 2009/0064332 A1 | 3/2009 | Porras et al. | |
| 2009/0077666 A1 | 3/2009 | Chen et al. | |
| 2009/0083369 A1 | 3/2009 | Marmor | |
| 2009/0083855 A1 | 3/2009 | Apap et al. | |
| 2009/0089879 A1 | 4/2009 | Wang et al. | |
| 2009/0094697 A1 | 4/2009 | Provos et al. | |
| 2009/0113425 A1 | 4/2009 | Ports et al. | |
| 2009/0125976 A1 | 5/2009 | Wassermann et al. | |

(56) References Cited

U.S. PATENT DOCUMENTS

| | | |
|---|---|---|
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0199296 A1 | 8/2009 | Xie et al. |
| 2009/0228233 A1 | 9/2009 | Anderson et al. |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0077481 A1 | 3/2010 | Polyakov et al. |
| 2010/0083376 A1 | 4/2010 | Pereira et al. |
| 2010/0100718 A1 | 4/2010 | Srinivasan |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1* | 11/2010 | Peterson et al. .............. 709/219 |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0047594 A1 | 2/2011 | Mahaffey et al. |
| 2011/0047620 A1 | 2/2011 | Mahaffey et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0113231 A1* | 5/2011 | Kaminsky .......................... 713/2 |
| 2011/0145920 A1 | 6/2011 | Mahaffey et al. |
| 2011/0167493 A1 | 7/2011 | Song et al. |
| 2011/0167494 A1 | 7/2011 | Bowen et al. |
| 2011/0173460 A1 | 7/2011 | Ito et al. |
| 2011/0219450 A1 | 9/2011 | McDougal et al. |
| 2011/0225655 A1 | 9/2011 | Niemela et al. |
| 2011/0247072 A1 | 10/2011 | Staniford et al. |
| 2011/0265182 A1* | 10/2011 | Peinado et al. .................. 726/24 |
| 2011/0289582 A1 | 11/2011 | Kejriwal et al. |
| 2011/0302587 A1 | 12/2011 | Nishikawa et al. |
| 2011/0307954 A1* | 12/2011 | Melnik et al. ..................... 726/22 |
| 2011/0307955 A1* | 12/2011 | Kaplan et al. .................... 726/23 |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1* | 3/2012 | Thomas et al. .................. 726/24 |
| 2012/0084859 A1* | 4/2012 | Radinsky et al. ................ 726/23 |
| 2012/0110667 A1 | 5/2012 | Zubrilin et al. |
| 2012/0117652 A1 | 5/2012 | Manni et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1* | 7/2012 | McCoy et al. ................... 726/22 |
| 2012/0198279 A1 | 8/2012 | Schroeder |
| 2012/0210423 A1* | 8/2012 | Friedrichs et al. .............. 726/22 |
| 2012/0222121 A1 | 8/2012 | Staniford et al. |
| 2012/0255017 A1 | 10/2012 | Sallam |
| 2012/0260342 A1 | 10/2012 | Dube et al. |
| 2012/0278886 A1 | 11/2012 | Luna |
| 2012/0297489 A1 | 11/2012 | Dequevy |
| 2012/0330801 A1 | 12/2012 | McDougal et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097705 A1* | 4/2013 | Montoro .......................... 726/24 |
| 2013/0097706 A1 | 4/2013 | Titonis et al. |
| 2013/0111587 A1 | 5/2013 | Goel et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0227691 A1 | 8/2013 | Aziz et al. |
| 2013/0246370 A1 | 9/2013 | Bartram et al. |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0169762 A1 | 6/2014 | Ryu |
| 2014/0179360 A1 | 6/2014 | Jackson et al. |
| 2014/0328204 A1 | 11/2014 | Klotsche et al. |
| 2014/0351935 A1 | 11/2014 | Shao et al. |

FOREIGN PATENT DOCUMENTS

| | | |
|---|---|---|
| WO | 0206928 A2 | 1/2002 |
| WO | 0223805 A2 | 3/2002 |
| WO | WO 2007/022454 | 2/2007 |
| WO | WO 2007/117636 | 10/2007 |
| WO | WO-2008/041950 | 4/2008 |
| WO | WO 2008/084259 | 7/2008 |
| WO | WO 2011/084431 | 7/2011 |
| WO | WO 2011/112348 | 9/2011 |
| WO | WO 2012/075336 | 6/2012 |
| WO | WO-2012145066 | 10/2012 |
| WO | WO 2013/067505 | 5/2013 |
| WO | WO 2014/057542 | 4/2014 |

OTHER PUBLICATIONS

Costa, M. et al. "Vigilante: End-to-End Containment of Internet Worms," SOSP '05, Oct. 23-26, 2005, Association for Computing Machinery, Inc., Brighton U.K.

Chaudet, C. et al. "Optimal Positioning of Active and Passive Monitoring Devices," International Conference on Emerging Networking Experiments and Technologies, Proceedings of the 2005 ACM Conference on Emerging Network Experiment and Technology, Oct. 2005, pp. 71-82, CoNEXT '05, Toulousse, France.

Crandall, J.R. et al., "Minos: Control Data Attack Prevention Orthogonal to Memory Model," 37th International Symposium on Microarchitecture, Dec. 2004, Portland, Oregon.

Kim, H. et al., "Autograph: Toward Automated, Distributed Worm Signature Detection," Proceedings of the 13th Usenix Security Symposium (Security 2004), Aug. 2004, pp. 271-286, San Diego.

Kreibich, J. et al., "Honeycomb—Creating Intrusion Detection Signatures Using Honeypots" 2nd Workshop on Hot Topics in Networks (HotNets-11), 2003, Boston, USA.

Newsome, J. et al., "Polygraph: Automatically Generating Signatures for Polymorphic Worms," In Proceedings of the IEEE Symposium on Security and Privacy, May 2005, pp. 226-241.

Newsome, J. et al., "Dynamic Taint Analysis for Automatic Detection, Analysis, and Signature Generation of Exploits on Commodity

(56) References Cited

OTHER PUBLICATIONS

Software," In Proceedings of the 12th Annual Network and Distributed System Security, Symposium (NDSS '05), Feb. 2005.
Singh, S. et al., "Automated Worm Fingerprinting," Proceedings of the ACM/USENIX Symposium on Operating System Design and Implementation, Dec. 2004, San Francisco, California.
Margolis, P.E., "Computer & Internet Dictionary 3rd Edition," ISBN 0375603519, Dec. 1998.
Whyte, D. et al. "DNS-Based Detection of Scanning Worms in an Enterprise Network," Proceedings of the 12th Annual Network and Distributed System Security Symposium, Feb. 2005. 15 pages.
Kristoff, J. "Botnets, Detection and Mitigation: DNS-Based Techniques," NU Security Day 2005, 23 pages.
IEEE Xplore Digital Library Search Results for "detection of unknown computer worms". Http//ieeexplore.ieee.org/searchresult.jsp?SortField=Score&SortOrder=desc&ResultC . . . Accessed on Aug. 28, 2009.
AltaVista Advanced Search Results. "Event Orchestrator". Http://www.altavista.com/web/results?Itag=ody&pg=aq
&aqmode=aqa=Event+Orchestrator . . . Accessed on Sep. 3, 2009.
AltaVista Advanced Search Results. "attack vector identifier". Http://www.altavista.com/web/result?Itag=ody&pg=aq
&aqmode=aqa=attack+vector+ide . . . Accessed on Sep. 15, 2009.
Silicon Defense, "Worm Containment in the Internal Network", Mar. 2003, pp. 1-25.
Nojiri, D. et al., "Cooperative Response Strategies for Large Scale Attack Mitigation", DARPA Information Survivability Conference and Exposition, Apr. 22-24, 2003, vol. 1, pp. 293-302.
Moore, D. et al., "Internet Quarantine: Requirements for Containing Self-Propagating Code", INFOCOM, Mar. 30-Apr. 3, 2003, vol. 3, pp. 1901-1910.
Williamson, Matthew M., "Throttling Viruses: Restricting Propagation to Defeat Malicious Mobile Code", ACSAC Conference, Dec. 2002, Las Vegas, NV, USA, pp. 1-9.
"Packet", Microsoft Computer Dictionary, Microsoft Press, Mar. 2002, 1 pg.
International Search Report and Written Opinion mailed May 10, 2012 in Application No. PCT/US12/21916.
International Search Report and Written Opinion mailed May 25, 2012 in Application No. PCT/US12/26402.
Petition for Inter Partes Review of U.S. Patent No. 8,291,499 Under 35 U.S.C. §§ 311-319 and 37 C.F.R. § 42, *Finjan, Inc.*, Petitioner V. *FireEye, Inc.*, Patent Owner; and Declaration of Professor Trent Jaeger in Support of Inter Partes Review of U.S. Patent, Jan. 9, 2014.
Reiner Sailer, Enriquillo Valdez, Trent Jaeger, Roonald Perez, Leendert van Doorn, John Linwood Griffin, Stefan Berger., *sHype: Secure Hypervisor Approach to Trusted Virtualized Systems* (Feb. 2, 2005) ("Sailer"), Exhibit 1015.
Excerpt regarding First Printing Date for Merike Kaeo, *Designing Network Security* ("Kaeo"), Exhibit 1025, (2004).
Adetoye, Adedayo, et al., "Network Intrusion Detection & Response System", ("Adetoye"), Exhibit 1022, (Sep. 2003).
Baecher, "The Nepenthes Platform: An Efficient Approach to collect Malware", *Springer-verlag Berlin Heidelberg*, (2006), pp. 165-184.
Bayer, et al., "Dynamic Analysis of Malicious Code", *J Comput Virol*, Springer-Verlag, France., (2006), pp. 67-77.
Boubalos, Chris , "Extracting syslog data out of a raw pcap dumps, seclists.org, Honeypots mailing list archives", available at http://seclists.org/honeypots/2003/q2/319 ("Boubalos"), Exhibit 1013.
Cohen, M.I. , "PyFlag—An advanced network forensic framework", *Digital investigation 5*, Elsevier, (2008), pp. S112-S120.
Distler, "Malware Analysis: An Introduction", *SANS Institute InfoSec Reading Room*, SANS Institute, (2007).
Dunlap, George W. , et al., "ReVirt: Enabling Intrusion Analysis through Virtual-Machine Logging and Replay", *Proceeding of the 5th Symposium on Operating Systems Design and Implementation, USENIX Association*, ("Dunlap"), Exhibit 1008, (Dec. 9, 2002).
Hjelmvik, Erik , "Passive Network Security Analysis with NetworkMiner", *(IN)SECURE*, Issue 18, (Oct. 2008), pp. 1-100.
Kaeo, Merike , "Designing Network Security", ("Kaeo"), Exhibit 1006, (Nov. 2003).
Krasnyansky, Max , et al., *Universal TUN/TAP driver*, available at https://www.kernel.org/doc/Documentation/networking/tuntap.txt (2002) ("Krasnyansky"), Exhibit 1027.
Liljenstam, Michael , et al., "Simulating Realistic Network Traffic for Worm Warning System Design and Testing", *Institute for Security Technology studies, Darthmouth College*, ("Liljenstram"), Exhibit 1007, (Oct. 27, 2003).
Marchette, David J., "Computer Intrusion Detection and Network Monitoring: A Statistical Viewpoint", ("Marchette"), Exhibit 1021, (2001).
Natgiv, Kurt , "SANDBOXII: Internet", *Virus Bulletin Conference*, ("Natvig"), Exhibit 1028, (Sep. 2002).
Spitzner, Lance , "Honeypots: Tracking Hackers", ("Spizner"), Exhibit 1023, (Sep. 17, 2002).
Thomas H. Ptacek, and Timothy N. Newsham , "Insertion, Evasion, and Denial of Service: Eluding Network Intrusion Detection", *Secure Networks*, ("Ptacek"), Exhibit 1011, (Jan. 1998).
Venezia, Paul , "NetDetector Captures Intrusions", *InfoWorld Issue 27*, ("Venezia"), Exhibit 1005, (Jul. 14, 2003).
Abdullah, et al., Visualizing Network Data for Intrusion Detection, 2005 IEEE Workshop on Information Assurance and Security, pp. 100-108.
Adobe Systems Incorporated, "PDF 32000-1:2008, Document management—Portable document format—Part1:PDF 1.7", First Edition, Jul. 1, 2008, 756 pages.
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Baldi, Mario; Risso, Fulvio; "A Framework for Rapid Development and Portable Execution of Packet-Handling Applications", 5th IEEE International Symposium on Signal Processing and Information Technology, Dec. 21, 2005, pp. 233-238.
Chrysanthou Yiannis (Modern Password Cracking: A hands-on approach to creating an optimised and versatile attack. Technical Report RHUL-MA-2013-7, May 1, 2013, 65 pages).
Clark, John, Sylvian Leblanc,and Scott Knight. "Risks associated with usb hardware trojan devices used by insiders." Systems Conference (SysCon), 2011 IEEE International. IEEE, 2011.
Didier Stevens: "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/
usenixsecurity12/sec12-final107.pdf [retrieved on Dec. 15, 2014].
FireEye Malware Analysis, Modern Malware Forensics, FireEye Inc., 2010.
FireEye Malware Analysis & Exchange Network, Malware Protection System, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review, vol. 42 Issue 3, pp. 21-28.
Heng Yin et al, Panorama: Capturing System-Wide Information Flow for Malware Detection and Analysis, Research Showcase @ CMU, Carnegie Mellon University, 2007.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Gregg Keizer: "Microsoft's HoneyMonkeys Show Patching Windows Works", Aug. 8, 2005, XP055143386, Retrieved from the

(56) References Cited

OTHER PUBLICATIONS

Internet: URL:https://web.archive.org/web/20121022220617/http://www.informationweek.com/microsofts-honeymonkeys-show-patching-wi/167600716 [retrieved on Sep. 29, 2014].

Leading Colleges Select FireEye to Stop Malware-Related Data Breaches, FireEye Inc., 2009.

Li et al., A VMM-Based System Call Interposition Framework for Program Monitoring, Dec. 2010, IEEE 16th International Conference on Parallel and Distributed Systems, pp. 706-711.

Lindorfer, Martina, Clemens Kolbitsch, and Paolo Milani Comparetti. "Detecting environment-sensitive malware." Recent Advances in Intrusion Detection. Springer Berlin Heidelberg, 2011.

Mori, Akira. "Detecting Unknown Computer Viruses." 2004, Springer-Verlag Berlin Heidelberg.

NetBIOS Working Group. Protocol Standard for a NetBIOS Service on a TCP/UDP transport: Concepts and Methods. STD 19, RFC 1001, Mar. 1987.

Oberheide et al., CloudAV_N-Version Antivirus in the Network Cloud, 17th USENIX Security Symposium USENIX Security '08 Jul. 28-Aug. 1, 2008 San Jose, CA.

Rautiainen et al: "A look at Portable Document Format vulnerabilities", Information Security Technical Report Elsevier Advanced Technology, Amsterdam, NL, vol. 14 No. 1, Feb. 1, 2009, pp. 30-33, XP026144094, ISSN: 1363-4127, DOI: 10.1016/J.ISTR.2009.04.001 [retrieved on May 8, 2009].

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Wahid et al., Characterising the Evolution in Scanning Activity of Suspicious Hosts, Oct. 2009, Third International Conference on Network and System Security, pp. 344-350.

Yuhei Kawakoya et al: "Memory behavior-based automatic malware unpacking in stealth debugging environment", Malicious and Unwanted Software (MALWARE), 2010 5th International Conference on, IEEE, Piscataway, NJ, USA, Oct. 19, 2010, pp. 39-45, XP031833827, ISBN:978-1-4244-8-9353-1.

Bayer et al., Dynamic analysis of malicious code, 2006, Springer-Verlag France.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

European Application No./Patent No. 12736373.7-1870/2666093; Extended European Search Report; Mailed May 21, 2014.

Anonymous: "Inside Adobe Reader Protected Mode—Part 1—Design", Oct. 5, 2010, XP055116424, Retrieved from the Internet: URL:http://blogs.adobe.com/security/2010/10/inside-adobe-reader-protected-mode-part-1-design.html [retrieved on May 6, 2014].

\* cited by examiner

SYSTEMS AND METHODS FOR DETECTING MALICIOUS PDF NETWORK CONTENT

CROSS-REFERENCE TO RELATED APPLICATIONS

This application is a continuation of U.S. patent application Ser. No. 13/011,344, entitled "Systems and Methods for Detecting Malicious PDF Network Content" and filed on Jan. 21, 2011, which is a continuation-in-part of U.S. patent application Ser. No. 12/263,971 entitled "Systems and Methods for Detecting Malicious Network Content" and filed on Nov. 3, 2008. This application is also related to U.S. patent application Ser. No. 11/409,355 entitled "Heuristic Based Capture with Replay to Virtual Machine" and filed on Apr. 20, 2006, which is a continuation-in-part of U.S. patent application Ser. No. 11/152,286 entitled "Computer Worm Defense System and Method" and filed on Jun. 13, 2005, which claims the priority benefit of U.S. Provisional Patent Application Ser. No. 60/579,910 entitled "Computer Worm Defense System and Method" and filed on Jun. 14, 2004.U.S. patent application Ser. No. 11/409,355 is also a continuation-in-part of U.S. patent application Ser. No. 11/096,287 entitled "System and Method of Detecting Computer Worms" and filed on Mar. 31, 2005, which claims the priority benefit of U.S. Provisional Patent Application Ser. No. 60/559,198 entitled "System and Method of Detecting Computer Worms" and filed on Apr. 1, 2004. U.S. patent application Ser. No. 11/409,355 is also a continuation-in-part of U.S. patent application Ser. No. 11/151,812 entitled "System and Method of Containing Computer Worms" and filed on Jun. 13, 2005, which claims the priority benefit of U.S. Provisional Patent Application No. 60/579,953 entitled "System and Method of Containing Computer Worms" and filed on Jun. 14, 2004. Each of the aforementioned patent applications are incorporated by reference herein.

BACKGROUND

1. Field of the Invention

The present invention relates generally to network security and more particularly to detecting malicious network content.

2. Related Art

Presently, malicious network content (e.g., malicious software or malware) can attack various devices via a communication network. For example, malware may include any program or file that is harmful to a computer user, such as bots, computer viruses, worms, Trojan horses, adware, spyware, or any programming that gathers information about a computer user or otherwise operates without permission.

Adware is a program configured to direct advertisements to a computer or a particular user. In one example, adware identifies the computer and/or the user to various websites visited by a browser on the computer. The website may then use the adware to either generate pop-up advertisements or otherwise direct specific advertisements to the user's browser. Spyware is a program configured to collect information regarding the user, the computer, and/or a user's network habits. In an example, spyware may collect information regarding the names and types of websites that the user browses and then transmit the information to another computer. Adware and spyware are often added to the user's computer after the user browses to a website that hosts the adware and/or spyware. The user is often unaware that these programs have been added and are similarly unaware of the adware and/or spyware's function.

Various processes and devices have been employed to prevent the problems that malicious network content can cause. For example, computers often include antivirus scanning software that scans a particular client device for viruses. Computers may also include spyware and/or adware scanning software. The scanning may be performed manually or based on a schedule specified by a user associated with the particular computer, a system administrator, and so forth. Unfortunately, by the time a virus or spyware is detected by the scanning software, some damage on the particular computer or loss of privacy may have already occurred.

In some instances, malicious network content comprises a bot. A bot is a software robot configured to remotely control all or a portion of a digital device (e.g., a computer) without authorization by the digital device's legitimate owner. Bot related activities include bot propagation and attacking other computers on a network. Bots commonly propagate by scanning nodes (e.g., computers or other digital devices) available on a network to search for a vulnerable target. When a vulnerable computer is scanned, the bot may install a copy of itself. Once installed, the new bot may continue to seek other computers on a network to infect. A bot may also be propagated by a malicious web site configured to exploit vulnerable computers that visit its web pages.

A bot may also, without the authority of the infected computer user, establish a command and control communication channel to receive instructions. Bots may receive command and control communication from a centralized bot server or another infected computer (e.g., via a peer-to-peer (P2P) network established by a bot on the infected computer). When a plurality of bots (i.e., a botnet) act together, the infected computers (i.e., zombies) can perform organized attacks against one or more computers on a network, or engage in criminal enterprises. In one example, bot infected computers may be directed to flood another computer on a network with excessive traffic in a denial-of-service attack. In another example, upon receiving instructions, one or more bots may direct the infected computer to transmit spam across a network. In a third example, bots may host illegal businesses such as pharmaceutical websites that sell pharmaceuticals without a prescription.

Malicious network content may be distributed over a network via web sites, e.g., servers operating on a network according to an HTTP standard. Malicious network content distributed in this manner may be actively downloaded and installed on a user's computer, without the approval or knowledge of the user, simply by accessing the web site hosting the malicious network content. The web site hosting the malicious network content may be referred to as a malicious web site. The malicious network content may be embedded within data associated with web pages hosted by the malicious web site. For example, a web page may include JavaScript code, and malicious network content may be embedded within the JavaScript code. In this example, the malicious network content embedded within the JavaScript code may be obfuscated such that it is not apparent until the JavaScript code is executed that the JavaScript code contains malicious network content. Therefore, the malicious network content may attack or infect a user's computer before detection by antivirus software, firewalls, intrusion detection systems, or the like.

Beginning on or about 2009, it became a widespread practice for the authors of bots to use malicious documents in the Portable Document Format (PDF) of Adobe Systems Inc. to propagate web borne attacks. Malicious PDF documents were hosted on web servers controlled by criminals, and then links to them created from many other websites. Innocent users could therefore accidentally, without realizing, browse a website which would cause a malicious PDF to be loaded into their browser, and from their into a PDF reader, which it would then exploit in order to gain control of the user's computer account, or entire computer. From there, malicious bot software would be installed.

SUMMARY

According to some embodiments, the present invention may be directed to methods detecting malicious portable document format (PDF) network content may include at least the steps of (a) examining at least a portion of received PDF network content to determine if one or more suspicious characteristics indicative of malicious network content are included in the at least a portion of PDF network content; and (b) wherein if the at least a portion of PDF network content is determined to include one or more suspicious characteristics indicative of malicious network content, providing the at least a portion of PDF network content to one or more virtual machines to verify the inclusion of malicious network content in the at least a portion of PDF network content.

DESCRIPTION OF EXEMPLARY EMBODIMENTS

Figure 1:
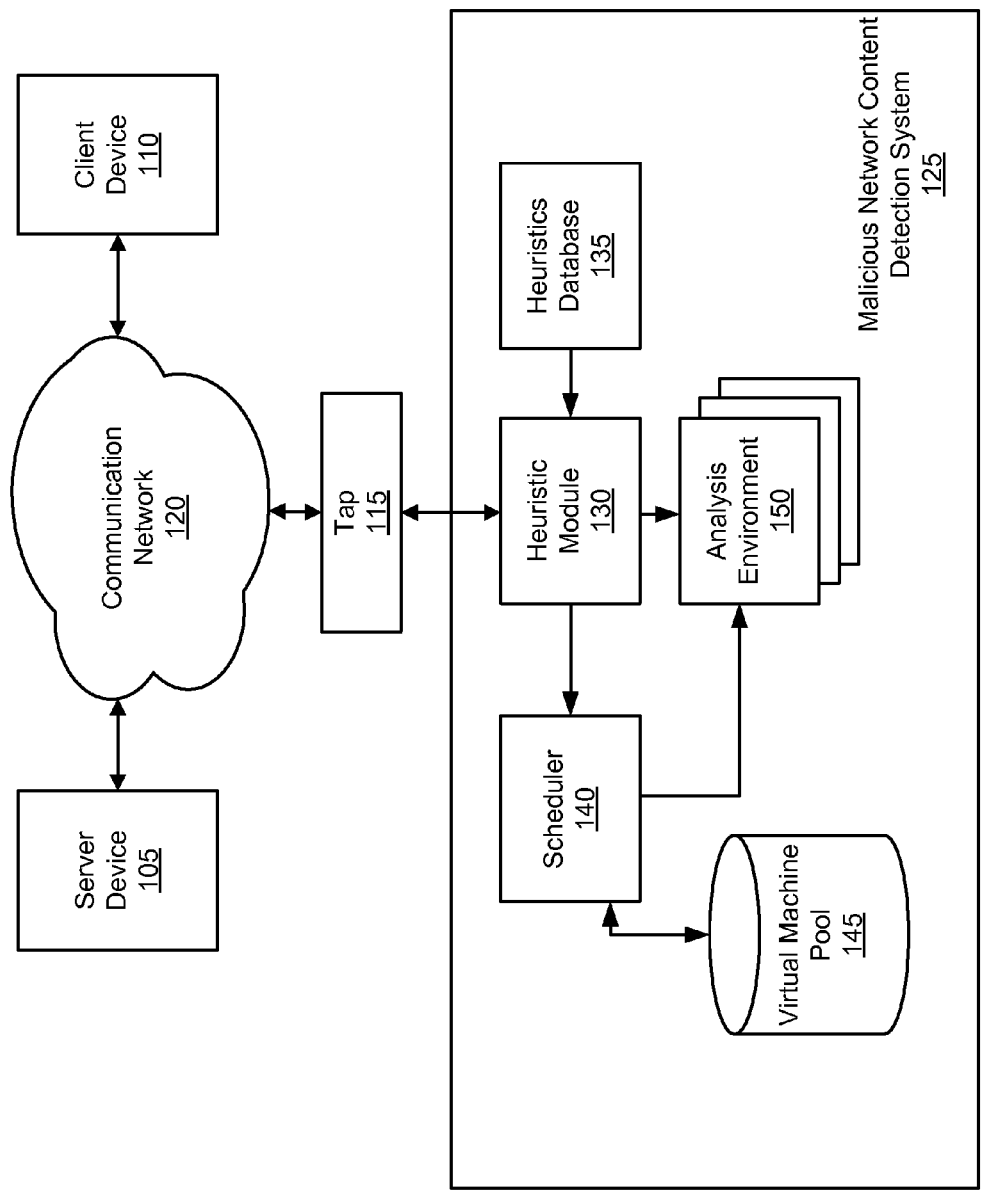
FIG. 1 is a diagram of an exemplary malicious network content detection environment 100.

Network content may include any data transmitted over a network (i.e., network data). Network data may include text, software, images, audio, or other digital data. An example of network content includes web content, or any network data that may be transmitted using a Hypertext Transfer Protocol (HTTP), HyperText Markup Language (HTML) protocol, or be transmitted in a manner suitable for display on a web browser software application. Another examples of network content includes email messages, which may be transmitted using an email protocol such as Simple Mail Transfer Protocol (SMTP), Post Office Protocol version 3 (POP3), or Internet Message Access Protocol (IMAP4). A further example of network content includes Instant Messages, which may be transmitted using an Instant Messaging protocol such as Session Initiation Protocol (SIP) or Extensible Messaging and Presence Protocol (XMPP). In addition, network content may include any network data that is transferred using other data transfer protocols, such as File Transfer Protocol (FTP). We distinguish network content from network protocol header information used for addressing, routing, and otherwise delivering the network content.

To detect malicious network content (e.g., malicious web content) being transmitted over a communication network to a computing device, a virtual machine may be used to simulate the receipt and processing of network content on the receiving system. A determination may be made as to whether the network content is malicious based on a response of the virtual machine to the network content. Sometimes, suspicious network content is determined to be non-malicious. Processing the suspicious network content in a virtual machine is an important step to determine whether the suspicious network content is in fact malicious and prevent a false assumption that the suspicious network content is malicious. False positives in detecting malicious network content may be avoided by processing suspicious network content in a virtual machine and detecting malicious network content by analyzing the virtual machine's response to the suspicious network content.

In the prior art, a proxy may be used in the network between the computing device and a web server hosting the malicious network content. The proxy may intercept a request for network content issued by a web browser executing on the computing device. The proxy may then issue the request to the web server as a proxy on behalf of the computing device. The proxy may receive a response to the request from the web server. The proxy may then process a data exchange including the request and response on a virtual machine and evaluate the virtual machine's response to the data exchange to detect malicious network content. If no malicious network content is detected, the proxy may forward the requested network content to the computing device from which the original request originated.

Because each data exchange is processed using a virtual machine, this approach is highly computation intensive, and is not scalable for large numbers of computing devices on a network. Also, because the requested network content is not delivered to the computing device until after it has been determined that the requested network content does not include malicious network content, a significant delay is introduced between the request for network content and the delivery of the requested network content.

Provos et al. (N. Provos, P. Mavrommatis, M. A. Rajab, and F. Monrose, "All your iFRAMEs Point to Us," Google Technical Report Provos-2008a, Feb. 4, 2008) reported on an analysis of web malware using a large web repository and corpus of malicious URLs. Provos et al. collected data for the analysis by first using a machine-learning framework in a pre-processing phase to extract features from web pages in the web repository and translate the features into a likelihood score. Next, a virtual machine was used in a verification phase to verify candidates identified by the machine-learning framework. Approximately 0.1% of the web pages in the web repository were processed by the virtual machine in the verification phase. Provos et al. noted that exhaustive inspection of each URL in the repository is prohibitively expensive. The system used by Provos et al. relied on a crawler proceeding gradually through the web to gather data in the repository for inspection, and could not inspect and select web pages in transit in the network for examination in a virtual machine.

FIG. 1 is a diagram of an exemplary malicious network content detection environment 100. The malicious network content detection environment 100 comprises a server device 105, a client device 110, and a tap 115 (also known as "a data access component"), each coupled to a communication network 120. In various embodiments, there may be multiple server devices 105 and multiple client devices 110. The tap 115 is further coupled to a malicious network content detection system 125. The malicious network content detection system 125 may monitor exchanges of network content (e.g., web content) rather than intercepting and holding the network content until after determining whether the network content includes malicious network content. The malicious network content detection system 125 may be configured to inspect exchanges of network content over the communication network 120, identify suspicious network content, and analyze the suspicious network content using a virtual machine to detect malicious network content. In this way, the malicious network content detection system 125 may be computationally efficient and scalable as data traffic volume and a number of computing devices communicating over the communication network 120 increase. Therefore, the malicious network content detection system 125 may not become a bottleneck in the malicious network content detection environment 100.

The communication network 120 may include a public computer network such as the Internet, or a private computer network such as a wireless telecommunication network, wide area network, or local area network, or a combination of networks. Though the communication network 120 may include any type of network and be used to communicate different types of data, communications of web data may be discussed below for purposes of example.

The server device 105 and the client device 110 may include digital devices. Some examples of digital devices include computers, servers, laptops, personal digital assistants, and cellular telephones. The server device 105 may be configured to transmit network data over the communication network 120 to the client device 110. The client device 110 may be configured to receive the network data from the server device 105. The network data may include network content, such as web pages transmitted using a network communications protocol (e.g., Hypertext Transfer Protocol, or HTTP). In various embodiments, the server device 105 may include a web server configured to provide network content. The client device 110 may include a web browser configured to retrieve and/or display network content.

The tap 115 may include a digital data tap configured to monitor network data and provide a copy of the network data to the malicious network content detection system 125. Network data may comprise signals and data that are transmitted over the communication network 120 including data flows from the server device 105 to the client device 110. In one example, the tap 115 monitors and copies the network data without an appreciable decline in performance of the server device 105, the client device 110, or the communication network 120. The tap 115 may copy any portion of the network data. For example, the tap 115 may receive and copy any number of data packets from the network data.

In some embodiments, the network data may be organized into one or more data flows and provided to the malicious network content detection system 125. In various embodiments, the tap 115 may sample the network data based on a sampling scheme. Data flows may then be reconstructed based on the network data samples.

The tap 115 may also capture metadata from the network data. The metadata may be associated with the server device 105 and/or the client device 110. For example, the metadata may identify the server device 105 and/or the client device 110. In some embodiments, the server device 105 transmits metadata, which is captured by the tap 115. In other embodiments, a heuristic module 130 (described herein) may determine the server device 105 and the client device 110 by analyzing data packets within the network data in order to generate the metadata.

The malicious network content detection system 125 may include a digital device, software, or a combination thereof that receives network data from the tap 115. The malicious network content detection system 125 includes a heuristic module 130, a heuristics database 135, a scheduler 140, a virtual machine pool 145, and an analysis environment 150. In some embodiments, the tap 115 may be contained within the malicious network content detection system 125.

The heuristic module 130 receives the copy of the network data from the tap 115 and applies heuristics to the data to determine if the network data might contain suspicious network content. The heuristics applied by the heuristic module 130 may be based on data and/or rules stored in the heuristics database 135. In one example, the heuristic module 130 flags network data as suspicious after applying a heuristic analysis. The network data may then be buffered and organized into a data flow. The data flow may then be provided to the scheduler 140. In some embodiments, the suspicious network data is provided directly to the scheduler 140 without buffering or organizing the data flow. In other embodiments, a notification of a group of data flows (e.g., a set of related web page requests and responses) may be sent to the scheduler 140 for later retrieval by the virtual machine.

The heuristic module 130 may perform one or more heuristic analyses on the network data. The heuristic module 130 may retain data packets belonging to a particular data flow previously copied by the tap 115. In one example, the heuristic module 130 receives data packets from the tap 115 and stores the data packets within a buffer or other memory. Once the heuristic module 130 receives a predetermined number of data packets from a particular data flow, the heuristic module 130 performs the heuristics and/or probability analysis.

In some embodiments, the heuristic module 130 performs a heuristic analysis on a set of data packets belonging to a data flow and then stores the data packets within a buffer or other memory. The heuristic module 130 may then continue to receive new data packets belonging to the same data flow. Once a predetermined number of new data packets belonging to the same data flow are received, the heuristic analysis may be performed upon the combination of buffered and new data packets to determine a likelihood of suspicious network content.

In some embodiments, an optional buffer receives the flagged network data from the heuristic module 130. The buffer may be used to store and organize the flagged network data into one or more data flows before providing the one or more data flows to the scheduler 140. In various embodiments, the buffer is used to store network data until the network data is provided to the scheduler 140. In one example, the buffer stores the network data to allow other components of the malicious network content detection system 125 time to complete functions or otherwise clear data congestion.

In some embodiments, the heuristic module 130 may maintain copies of network content data of potential interest to virtual machines and provide the network content data on request (e.g., when a web browser later executes inside a virtual machine and requests entities that were transmitted on the network earlier). The length of time that the heuristic module 130 keeps this data in memory may be based on how suspicious the data is, how much workload the system is under, and/or other factors.

The scheduler 140 may identify the client device 110 and retrieve a virtual machine associated with the client device 110. A virtual machine is software that is configured to mimic the performance of a device (e.g., the client device 110). The virtual machine may be retrieved from the virtual machine pool 145. Furthermore, the scheduler 140 may identify a web browser running on the client device 110, and retrieve a virtual machine associated with the web browser.

In some embodiments, the heuristic module 130 transmits the metadata identifying the client device 110 to the scheduler 140. In other embodiments, the scheduler 140 receives one or more data packets of the network data from the heuristic module 130 and analyzes the one or more data packets to identify the client device 110. In yet other embodiments, the metadata may be received from the tap 115.

The scheduler 140 may retrieve and configure the virtual machine to mimic the pertinent performance characteristics of the client device 110. In one example, the scheduler 140 configures the characteristics of the virtual machine to mimic only those features of the client device 110 that are affected by the network data copied by the tap 115. The scheduler 140 may determine the features of the client device 110 that are affected by the network data by receiving and analyzing the network data from the tap 115. Such features of the client device 110 may include ports that are to receive the network data, select device drivers that are to respond to the network data, and any other devices coupled to or contained within the client device 110 that can respond to the network data. In other embodiments, the heuristic module 130 may determine the features of the client device 110 that are affected by the network data by receiving and analyzing the network data from the tap 115. The heuristic module 130 may then transmit the features of the client device to the scheduler 140.

The virtual machine pool 145 may be configured to store one or more virtual machines. The virtual machine pool 145 may include software and/or a storage medium capable of storing software. In one example, the virtual machine pool 145 stores a single virtual machine that can be configured by the scheduler 140 to mimic the performance of any client device 110 on the communication network 120. The virtual machine pool 145 may store any number of distinct virtual machines that can be configured to simulate the performance of a wide variety of client devices 110.

The analysis environment 150 simulates the receipt and/or display of the network content from the server device 105 after the network content is received by the client device 110 to analyze the effects of the network content upon the client device 110. The analysis environment 150 may identify the effects of malware or malicious network content by analyzing the simulation of the effects of the network content upon the client device 110 that is carried out on the virtual machine. There may be multiple analysis environments 150 to simulate multiple streams of network content. The analysis environment 150 is further discussed with respect to FIG. 2.

Although FIG. 1 depicts data transmitted from the server device 105 to the client device 110, either device can transmit and receive data from the other. Similarly, although only two devices are depicted, any number of devices can send and/or receive data across the communication network 120. Moreover, the tap 115 can monitor and copy data transmitted from multiple devices without appreciably affecting the performance of the communication network 120 or the devices coupled to the communication network 120.

Figure 2:
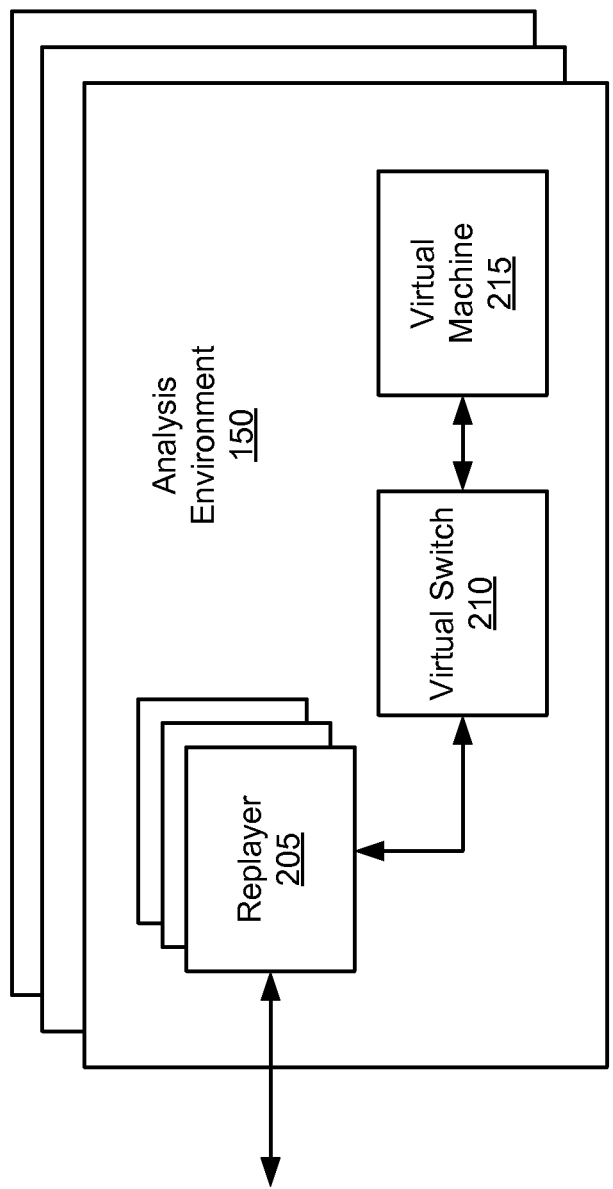
FIG. 2 illustrates an exemplary analysis environment.

FIG. 2 illustrates an exemplary analysis environment 150. The analysis environment 150 includes a replayer 205, a virtual switch 210, and a virtual machine 215. The replayer 205 receives network content that has been flagged by the heuristic module 130 and provides the network content to the virtual machine 215 via the virtual switch 210 (i.e., replays the network content) in the analysis environment 150. In some embodiments, the replayer 205 mimics the behavior of the server device 105 in transmitting the flagged network content. There may be any number of replayers 205 simulating the transmission of network content between the server device 105 and the client device 110. In a further embodiment, the replayer 205 dynamically modifies session variables, as is appropriate, to emulate a "live" client or server of the protocol sequence being replayed. In one example, dynamic variables that may be dynamically substituted include dynamically assigned ports, transaction IDs, and any other variable that is dynamic to each protocol session.

The virtual switch 210 may include software that is capable of forwarding packets of flagged network content to the virtual machine 215. In one example, the replayer 205 simulates the transmission of the data flow by the server device 105. The virtual switch 210 simulates the communication network 120, and the virtual machine 215 simulates the client device 110. The virtual switch 210 may route the data packets of the data flow to the correct ports of the virtual machine 215.

In some embodiments, requests for data from client software in the virtual machine 215 (e.g., a web browser) may be proxied by the replayer to the heuristic module 130 where the data has been cached, and a response from the heuristic module 130 may then be proxied back to the client software executing in the virtual machine 215.

The virtual machine 215 includes a representation of the client device 110 that may be provided to the analysis environment 150 by the scheduler 140. In one example, the scheduler 140 retrieves an instance of the virtual machine 215 from the virtual machine pool 145 and configures the virtual machine 215 to mimic a client device 110. The configured virtual machine 215 is then provided to the analysis environment 150 where it may receive flagged network content from the virtual switch 210.

As the analysis environment 150 simulates the transmission and reception of the network content, behavior of the virtual machine 215 can be closely monitored for unauthorized activity. If the virtual machine 215 crashes, performs illegal operations, performs abnormally, or allows access of data to an unauthorized entity (e.g., an unauthorized computer user, a bot, etc.), the analysis environment 150 may react. In one example, the analysis environment 150 may transmit a command to the client device 110 to stop accepting the network content or data flows from the server device 105.

In some embodiments, the analysis environment 150 monitors and analyzes the behavior of the virtual machine 215 in order to determine a specific type of malware or malicious network content. The analysis environment 150 may also generate computer code configured to eliminate new viruses, worms, bots, adware, spyware, or other malware or malicious network content. In various embodiments, the analysis environment 150 generates computer code configured to repair damage performed by malware or malicious network content. By simulating the transmission and reception of suspicious network content and analyzing the response of the virtual machine 215, the analysis environment 150 may identify known and previously unidentified malware and malicious network content before a computer system is damaged or compromised.

Figure 3:
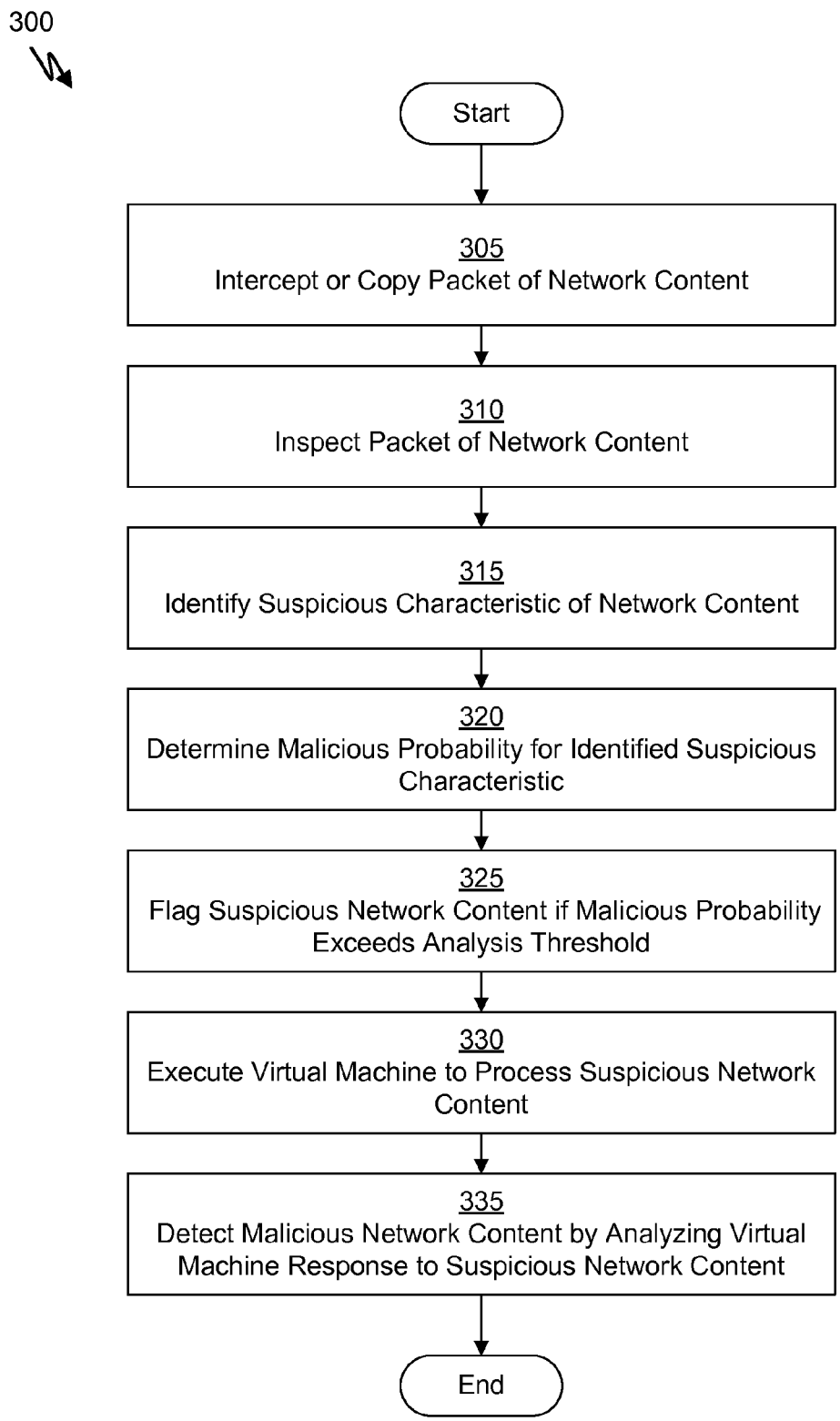
FIG. 3 illustrates an exemplary method for detecting malicious network content.

FIG. 3 illustrates an exemplary method 300 for detecting malicious network content. In step 305, a packet of network content is intercepted or copied. The packet may be intercepted and/or copied from a network data transmission between the server device 105 and an intended destination (e.g., the client device 110), such as by the tap 115. Alternatively, the packet may be intercepted and/or copied from a network data transmission between the client device 110 and an intended destination (e.g., the server device 105). The packet may include a request for data, such as network content, or data provided in response to a request.

In step 310, a packet of network content is inspected. The heuristic module 130 may utilize one or more heuristics to inspect the packet of network content for suspicious network content which indicates the potential presence of malicious network content or malware within the packet.

A packet of network content may be part of a data flow which includes additional packets of network content. For example, the packet of network content may represent a portion of a web page, while other related packets in the data flow represent additional portions of the web page. The packet of network content may be stored along with the other related packets of network content comprising the data flow, such that multiple packets of network content within the data flow may be inspected in a sequence or in parallel. The malicious network content detection system may store the packets of network content and all or a portion of a data flow. The data flow and data packets may be stored for any length of time, from a few seconds to minutes, tens of minutes, or more, for analysis at any time.

To facilitate longer storage times for data flows over a high data rate communication network, large data objects comprised of numerous data packets may be truncated to a small subset of representative data packets. Data object truncation is particularly useful where network communication bandwidth is mostly utilized by a small percentage of large data objects, such as video. For example, video data may be truncated to a few data packets, such as the first few data packets. An extent to which the large data objects are truncated may be adaptive based on available memory, data bandwidth, type of data objects, and other factors. An amount of memory allocated to storing a data flow may also be dependent upon a characteristic of the data flow, such as data type. In an example, octet streams, text streams, HTML streams, and miscellaneous binary streams may be allocated 1 megabyte (MB). Images and PDF files may be allocated 384 kilobytes (kB). Video, audio, and most other data types may be allocated 128 kB. The memory allocated to storing each data flow type may be adjusted, periodically or dynamically, to improve analysis throughput while maintaining accuracy in detection of malicious network content and working within memory limitations.

In step 315, a suspicious characteristic of the network content is identified. The heuristic module 130 may identify the suspicious characteristic of the network content as a result of inspecting the network content in step 310. When a characteristic of the packet, such as a sequence of characters or keyword, is identified that meets the conditions of a heuristic used in step 310, a suspicious characteristic or "feature" of the network content is identified. The identified features may be stored for reference and analysis. In some embodiments, the entire packet may be inspected and multiple features may be identified before proceeding to the next step. In some embodiments, features may be determined as a result of an analysis across multiple packets comprising the network content.

Keywords used by heuristics may be chosen by performing an approximate Bayesian probability analysis of all the keywords in an HTML specification using a corpus of malicious network content and a corpus of non-malicious network content. The approximate Bayesian probability analysis may be based on the principles of the Bayesian theorem and/or naïve Bayesian classification. For instance, a probability $P_m$ that the keyword appears in malicious network content may be computed using the corpus of malicious network content, while a probability $P_n$ that the keyword appears in non-malicious network content may be computed using the corpus of non-malicious network content. A given keyword may be determined to be a suspicious characteristic for being associated with malicious network content if a score based on a computed ratio $P_m/P_n$ exceeds a threshold of suspicion. The threshold of suspicion may be a value greater than 1, 10, 30, 60, 100, or some other number indicating how much more likely the suspicious characteristic is to indicate malicious network content than to indicate non-malicious network content.

In step 320, a score related to a probability that the suspicious characteristic identified in step 315 indicates malicious network content is determined. An approximate Bayesian probability analysis may be used to determine the score. In various embodiments, the approximate Bayesian probability analysis may be performed in real-time or using a look-up table based on a previously performed approximate Bayesian probability analysis.

For example, the approximate Bayesian probability analysis may be performed to determine a relative probability score that a particular feature is associated with the presence of malicious network content in a packet by comparing a corpus of malicious network content and a corpus of regular, non-malicious network content. A feature may include a characteristic of the packet, such as a sequence of characters or keyword, that meets the conditions of a heuristic used in step 310. The feature may also include a characteristic involving more than one packet inspected in sequence or in parallel. An example of a feature may include the character sequence "eval(unescape(", which indicates a JavaScript "unescape" command nested within a JavaScript "eval" command argument. Further examples of features are described below with respect to step 445 in method 400. A probability $P_{f|m}$ that the feature is present in a packet of malicious network content is computed by analyzing the corpus of malicious network content. A probability $P_{f|n}$ that the feature is present in a packet of non-malicious network content is computed by analyzing the corpus of non-malicious network content. A malicious probability score is computed as the base two logarithm of a relative probability factor $P_{m|f}$ that the feature is associated with malicious network content. The malicious probability score is computed by computing the ratio of the base two logarithm ($\log_2$) of the probability that the feature is present in a packet of malicious network content and the base two logarithm of the probability that the feature is present in a packet of non-malicious network content. The relative probability factor $P_{m|f}$ may be expressed as follows:

$$\log_2(P_{m|f}) = \log_2(P_{f|m})/\log_2(P_{f|n}) \qquad \text{Equation 1}$$

The size of the result $\log_2(P_{m|f})$ (i.e., malicious probability score) may indicate the probability that the suspicious network content includes malicious network content. For example, a result of eleven may indicate that the feature is approximately two thousand times more likely to appear in malicious network content than in non-malicious network content. Likewise, a value of twelve may indicate that the feature is approximately four thousand times more likely to appear in malicious network content.

In some embodiments, the malicious corpus and/or the non-malicious corpus may be continuously updated in response to monitored network data traffic, and the malicious probability scores associated with the features may be continuously updated in response to the updates to the corpuses. In other embodiments, the corpuses may be created and used in advance to store pre-computed malicious probability scores in a look-up table for reference when features are identified. The features associated with significant probabilities of malicious network content may change as the corpuses change.

In step 325, malicious network content is identified or flagged if the malicious probability score of a feature computed in step 320 satisfies an analysis threshold. The analysis threshold may be greater than 1, 10, 30, 60, 100, 1000, 2000, or higher. The analysis threshold may be preset, or may be variable based on operating conditions of the malicious network content detection system 125. If the malicious probability score does not satisfy the analysis threshold, no action may be taken with regard to the feature associated with the malicious probability score. Otherwise, the analysis may proceed to the next step, such as step 330 for analysis through processing by a virtual machine, such as the virtual machine 215. In some embodiments, the malicious probability scores of all features computed in step 320 may be compared against the analysis threshold to assign a priority level to each feature and/or the packet as a whole. The priority level may be computed based on a variety of factors, such as the number of features identified in the packet, the highest malicious probability score of a feature in the packet, an average malicious probability score of the features in the packet, a mean malicious probability score of the features in the packet, and the like.

The analysis threshold may be adaptive or be frequently updated based on operating conditions of the malicious network content detection system 125. For example, the threshold value may be dynamically revised according to a quantity of packets of network content to be inspected. As a quantity of data packets which are intercepted and/or copied from the network data transmission in step 310 increases, a quantity of data packets to be inspected may also increase. This may increase a computational load and leave less computational bandwidth available for more detailed analysis of the data packets. Consequently, the threshold may be increased to compensate for the decrease in available computational bandwidth for more detailed analysis. As another example, the threshold value may be dynamically revised according to an availability of one or more virtual machines to be used for the more detailed analysis. The threshold value may be set such that only features which have a significant probability of indicating malicious network content are processed using a virtual machine. For example, out of over one thousand features, less than fifty may be considered significant.

There may be multiple dynamically adaptive thresholds, which may be synchronized with each other. For example, the scheduler 140 may use a threshold to determine whether a virtual machine should be dispatched to process a queued suspicious network content. The scheduler 140's threshold may increase due to lack of available computational resources for the analysis environment 150 to execute virtual machines. The heuristic module 130 may use another threshold to determine whether heuristics should be applied to an identified feature. The heuristic module 130's threshold may be based on the malicious probability score for the identified feature. As the scheduler 140's threshold increases, the heuristic module 130's threshold may also increase. This is because flagging suspicious network content based on running heuristics on identified features may be irrelevant and an inefficient use of computational resources if the scheduler 140 will not process the suspicious network content in a virtual machine due to an increased threshold in the scheduler 140.

After suspicious network content has been flagged at step 325 for further analysis, the entire stored data flow including the suspicious network content may be reanalyzed. Each feature may be given a higher malicious probability score by virtue that one feature in the data flow has been found to have a malicious probability score greater than the threshold. A priority level for each feature found in the data flow may also be increased. Furthermore, all data packets and data flows associated with any domains associated with suspicious network content may be cached and given higher priorities and malicious probability scores than they would otherwise. The scheduler 140 may execute the virtual machine to process each flagged suspicious network content in the data flow individually, in priority order, in their original sequence of presentation, or in some other order. The virtual machine may process the suspicious network content until pre-empted by a higher priority suspicious network content.

In step 330, a virtual machine is executed to process the suspicious network content. The virtual machine may effectively replay the suspicious network content in a web browser executing on the virtual machine. The heuristic module 130 may provide the packet containing the suspicious network content to the scheduler 140, along with a list of the features present in the packet and the malicious probability scores associated with each of those features. Alternatively, the heuristic module 130 may provide a pointer to the packet containing the suspicious network content to the scheduler 140 such that the scheduler 140 may access the packet via a memory shared with the heuristic module 130. In another embodiment, the heuristic module 130 may provide identification information regarding the packet to the scheduler 140 such that the scheduler 140, replayer 205, or virtual machine may query the heuristic module 130 for data regarding the packet as needed.

The heuristic module 130 may also provide a priority level for the packet and/or the features present in the packet. The scheduler 140 may then load and configure a virtual machine from the virtual machine pool 145, and dispatch the virtual machine to the analysis environment 150 to process the suspicious network content. The virtual machine may be configured to execute for a minimum amount of processing, or for a minimum period of time, such as approximately 45 seconds. After the minimum period of time passes, the virtual machine may be pre-empted by the scheduler 140 to dispatch another virtual machine. Multiple virtual machines may be run simultaneously.

The scheduler 140 may choose which feature to process first according to the priority levels provided by the heuristic module 130. The scheduler 140 may cause another virtual machine already processing or analyzing another feature or packet, or set of packets, in the analysis environment 150 to terminate prior to dispatching the loaded virtual machine. For example, this may occur if computational resources are occupied with other virtual machines processing other features and therefore are not available to execute the loaded virtual machine. The scheduler 140 may choose which virtual machine(s) to terminate based on the priority levels of the features being processed by the virtual machine, how much time the virtual machine has already spent executing, or other reasons.

The scheduler 140 may reprioritize suspicious network content already in queue to be processed by virtual machines based on newly identified suspicious network content. For example, already queued suspicious network content may be reprioritized if there is a domain identified in common with the newly identified suspicious network content. Numerous incidents of suspicious network content associated with a single domain may increase the priority of all suspicious network content associated with the domain.

The replayer 205 in the analysis environment 150 may keep track of network content requested by the virtual machine. If suspicious network content already in the scheduler 140's queue is requested and processed by the virtual machine while processing other previously dispatched suspicious network content, and the queued suspicious network content is not found to be malicious, then the scheduler 140 may delete the queued suspicious network content from the queue. In this way, computational requirements can be reduced because an item of suspicious network content may only be processed in a virtual machine once, rather than each time a reference to the item of suspicious network content is made by another item of suspicious network content.

In step 335, malicious network content is detected by analyzing the virtual machine response to the suspicious network content. The analysis environment 150 may be configured to monitor the virtual machine for indications that the suspicious network content is in fact malicious network content. The analysis environment 150 may monitor the virtual machine for unusual memory accesses, unusual spawning of executable processes, unusual network transmissions, crashes, unusual changes in performance, and the like. The analysis environment may flag the suspicious network content as malicious network content according to the observed behavior of the virtual machine.

If a virtual machine processes suspicious network content for greater than a predetermined amount of time without any malicious network content being detected, the scheduler 140 may terminate the virtual machine to free up computational resources. The predetermined amount of time may be variable, according to a queue of suspicious network content that is awaiting processing by a virtual machine, the probability that the suspicious network content may be malicious network content, the feature being evaluated by the virtual machine, available computational resources, and the like. For example, the predetermined amount of time may be 45 seconds, two minutes, twenty minutes, or any other length of time.

If the suspicious network content is determined to be malicious network content, the malicious network content detection system 125 may report the malicious network content and/or log the malicious network content for future reference. For example, the malicious network content detection system 125 may generate an alert for a network content packet detected to include malicious network content. The malicious network content detection system 125 may report the malicious network content to an entity responsible for the client device 105. If the malicious network content was determined to originate from the server device 105, the client device 110 may be instructed not to continue network transmissions with the server device 105. If a party responsible for the server device 105 is known, the malicious network content detection system 125 may report the malicious network content to the party responsible for the server device 105. The server device 105 may be added to a list of malicious network content providers, and future network transmissions originating from the server device 105 may be blocked from reaching their intended destinations.

Figure 4:
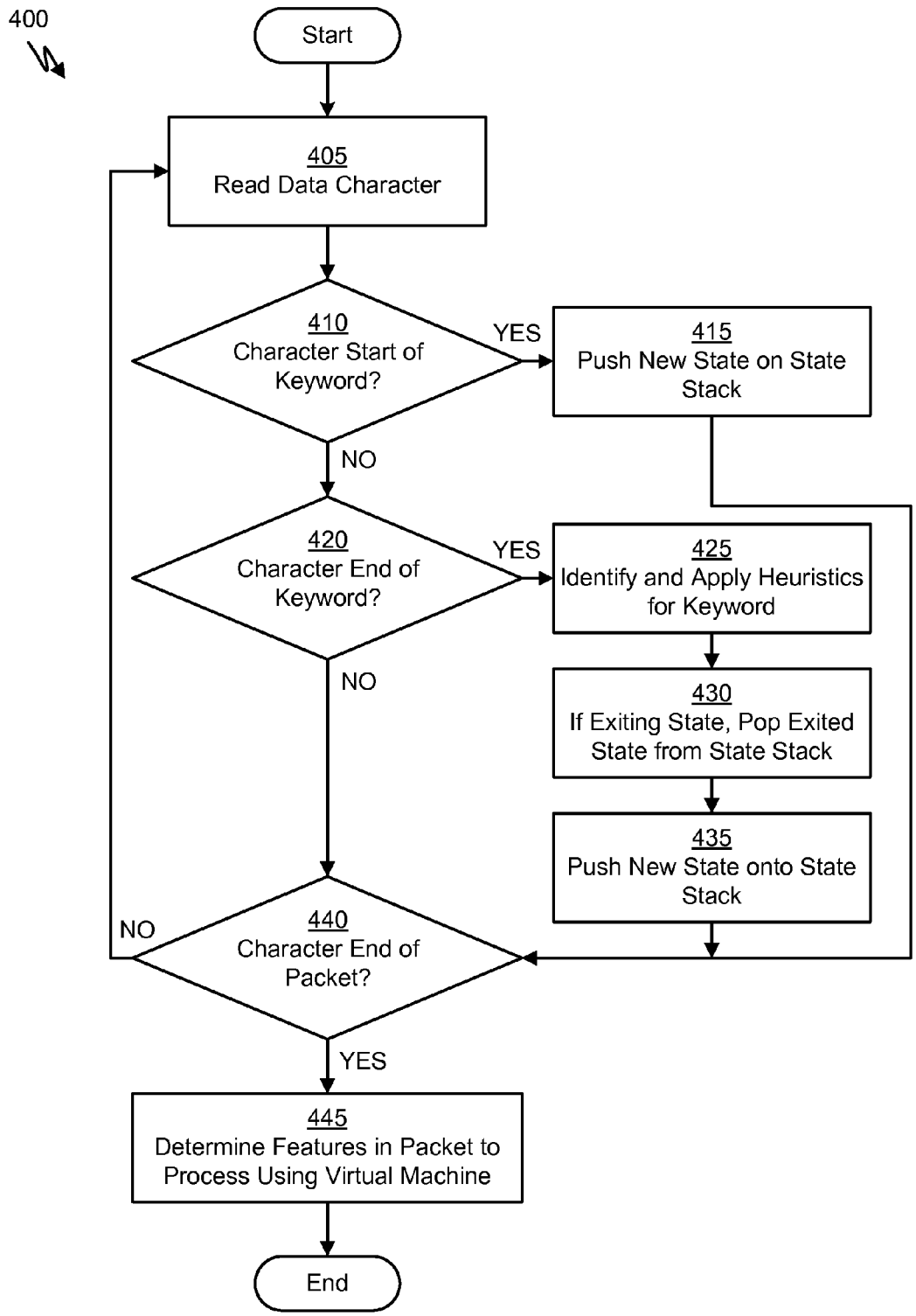
FIG. 4 illustrates another exemplary method for detecting malicious network content.

FIG. 4 illustrates another exemplary method 400 for detecting malicious network content. The method 400 may be performed by the heuristic module 130. In the method 400, a packet of network content is inspected to identify features which may indicate the presence of malicious network content. The method 400 may include the use of a single pass parser and/or an augmented finite state machine, which may maintain a stack of states. The method 400 may begin processing a data packet starting with a character after a character sequence "HTTP" has been identified.

In step 405, a data character is read from the data packet. The data character read may be subsequent to the character sequence "HTTP" or a data character previously read in a prior iteration of step 405. A pointer may be incremented to indicate the next data character to read in the method 400.

In step 410, the data character read in step 405 is evaluated to determine if the data character may indicate the start of a possible keyword or a possible feature as described with respect to method 300, or a different kind of data (e.g., Java-Script content embedded in HTML content). The data character may include a left angled bracket (i.e., "<"), for example. If the data character read may indicate the start of a keyword or a feature, the method may proceed to step 415. Otherwise, the method may proceed to step 420.

In step 415, a new state is pushed onto the stack of states to indicate that the method 400 has encountered the start of a keyword or feature. The new state may be an InKeyword state to indicate that the method is in the midst of processing a keyword. Depending on the character read, a different new state may be pushed onto the stack. A string of data characters may be stored, starting with the most recent character read or the next character to be read. The method 400 then proceeds to step 440.

In step 420, the data character read in step 405 is evaluated to determine if the data character may indicate the end of a keyword or a feature as described with respect to method 300. The data character may include a right angled bracket (i.e., ">"), for example. If the data character read may indicate the end of a keyword or a feature, the method may proceed to step 425. Otherwise, the method may proceed to step 440.

In step 425, heuristics to be applied to the data packet are identified and applied based on a character string read, which may start with the data character identified in step 410 and end with the data character identified in step 420. The heuristic module 300 may store the character string. The character string may be compared against a database of character strings stored in the heuristics database 135 to determine one or more heuristics that may be applied to the data packet based on the keyword. In some embodiments, a list of results of applying heuristics may be created. The list of results may be stored so that the list may be referenced in step 445.

Some examples of a heuristic that may be applied to the packet include keyword matches. Some keywords may be associated more with malicious network content than non-malicious network content, and their presence in a packet of network content may be an indication that the packet contains suspicious network content.

In one exemplary heuristic, an object filename's extension following a period may be examined. For example, a filename ending in the characters ".ini", ".anr", or ".htm" may be determined to be suspicious. Also, a filename generally associated with one filetype but associated with a different file type in the reference may be determined to be suspicious. For example, a filename ending in ".jpg" which is not referring to an image file may be determined to be suspicious.

In other exemplary heuristics, content of web pages may be analyzed to determine whether network content is suspicious. For example, presence of small iframes, such as an iframe in which the width and/or height is 0 or 1 pixel, in a web page may be determined to be suspicious.

Further examples of heuristics may be associated with JavaScript code sequences. When an "eval(unescape( . . . ))" JavaScript command sequence, which includes an "unescape" command nested within the argument of an "eval" command, is detected in the data packet, the heuristic may evaluate the command sequence to identify suspicious network content. The "eval(unescape( . . . ))" command sequence may be used to obfuscate malicious network content so that the malicious network content is not easily detected in the network data transmission, and may therefore indicate suspicious network content.

Another example of a heuristic is a length of the argument of the "unescape" or other JavaScript function from a starting character to an ending character. The length may be determined by counting a number of characters, or measuring a length of time, between the opening parenthesis and the closing parenthesis after "unescape" or other function name. A greater number of characters between the parentheses may indicate that an obfuscated body to the command is being used.

Bi-gram detection is another exemplary heuristic that may be employed in JavaScript or other types of network content. In bi-gram detection, character transitions within the network content are analyzed. A table of conditional probabilities may be generated and updated continuously as data is evaluated. The table of conditional probabilities indicates the probability of each second character appearing after each first character. The conditional probability of a second character $C_2$ given the first character $C_1$ may be written as $P(C_2|C_1)$. The heuristic may identify when a string of unusual character transitions occurs according to the table of conditional probabilities. Thresholds for the length of the string of unusual character transitions, combined with the values of the conditional probabilities that flags the character transitions as being unusual, may be set a priori based on an approximate Bayesian probability analysis using a corpus of malicious network content and a corpus of non-malicious network content. Alternatively, the thresholds may be adjusted in near real time as the table of conditional probabilities is updated. For example, a long string of unusual character transitions may indicate the presence of malicious network content in a JavaScript "eval(unescape( . . . ))" clause.

The use of domain profiles is another exemplary heuristic that may be used to reduce a rate of false positives from other heuristics. The domain profiles heuristic may be used in conjunction with other heuristics in order to increase throughput and reduce computational requirements for detecting malicious network content. Each network domain with which monitored network content is exchanged may be cataloged and annotated with a list of the features present in network content associated with the network domain. A typical network domain may be approximately constant in the features present in associated network content. When a feature is identified by another heuristic, the feature may be looked up in the list of features associated with the network domain. If the feature is listed as being associated with the network domain, and malicious network content was not previously detected due to identification of the feature in network content associated with the domain, a virtual machine may not be executed to process the network content containing the feature associated with the network domain. If, on the other hand, the feature was not previously detected or associated with the network domain, the network content may be identified as being suspicious and processed by a virtual machine.

A list of domains or web sites containing malicious network content may be maintained. The list of sources of malicious network content may be hosted on the computer network and accessible by clients on the computer network. The heuristic module 130 may access the list of domains and web sites containing malicious network content to supplement the information provided by the domain profiles heuristic. For example, the threshold for network content associated with a web site on a list of malicious network content sources may be set to be lower and/or the priority of a suspicious network content may be set higher than for other network content. When malicious network content is detected, the list of domains may be notified or updated with the information for reference by others.

In step 430, if a state is being exited, the state being exited is popped from the stack of states. The state being exited is the most recent state pushed onto the stack of states. For example, if the state being exited is the InKeyword state, the InKeyword state is popped from the stack of states to indicate that the method is no longer in the midst of reading a keyword. If a state is not being exited, a state may not be popped from the stack, and multiple states may be stored on the stack. In some embodiments, up to 32 states may be present on the stack of states at one time. For example, JavaScript may have embedded HTML, and therefore multiple states may be active at one time to account for nested features. In various embodiments, there may be more than 60 states associated with data packets being analyzed for malicious network content.

In step 435, a new state is pushed onto the stack of states to indicate that the method is now in the midst of a new state. The new state may be determined by the last keyword that was read, or a character indicating a new kind of content. For example, the new state may be an InBetweenKeyword state to indicate that the method is awaiting another keyword to process. In some embodiments, the new state may be an InJavaScript state to indicate that the method is in the midst of reading a JavaScript segment. The state may impact which heuristics are identified and applied to the packet of web data in step 445. For example, a first heuristic may be chosen if a first state is active, whereas a second heuristic may be chosen if a second state is active.

In step 440, the count of characters read in step 405 is evaluated to determine if the data character may lie at the end of a packet. If the data character lies at the end of the packet, the method may proceed to step 445. Otherwise, the method may proceed to step 405.

In step 445, the list of results produced by applying the heuristics in step 425 for the features in the data packet are referenced to determine which features in the data packet are to be processed using a virtual machine. Malicious probability scores for each feature may be compared against a threshold to determine whether the feature indicates suspicious network content. The features associated with the data packet may be ranked in priority order. The features may be used to prioritize whether to refer the data packet, and associated content, to a virtual machine in the order identified in step 425, in the priority order determined by their respective malicious probability scores, or in some other order.

Figure 5:
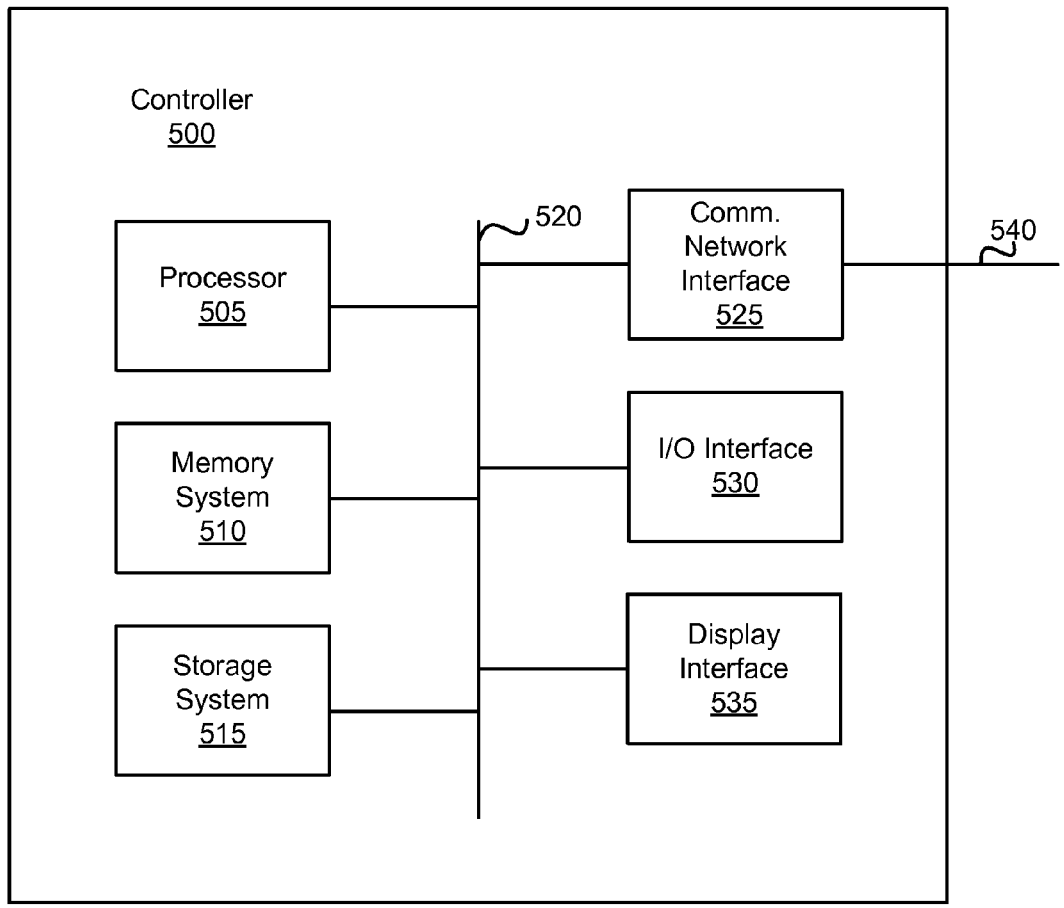
FIG. 5 illustrates an exemplary controller.

FIG. 5 illustrates an exemplary controller 500. The controller 500 may comprise the malicious network content detection system 125 according to some embodiments. The controller 500 comprises at least a processor 505, a memory system 510, and a storage system 515, which are all coupled to a bus 520. The controller 500 may also comprise a communication network interface 525, an input/output (I/O) interface 530, and a display interface 535. The communication network interface 525 may couple with the communication network 120 via a communication medium 540. In some embodiments, the controller 500 may couple to a tap, such as the tap 115, which in turn couples with the communication network 120. The bus 520 provides communications between the communications network interface 525, the processor 505, the memory system 510, the storage system 515, the I/O interface 530, and the display interface 535.

The communications network interface 525 may communicate with other digital devices (not shown) via the communications medium 540. The processor 505 executes instructions. The memory system 510 permanently or temporarily stores data. Some examples of the memory system 510 are RAM and ROM. The storage system 515 also permanently or temporarily stores data. Some examples of the storage system 515 are hard disks and disk drives. The I/O interface 530 may include any device that can receive input and provide output to a user. The I/O interface 530 may include, but is not limited to, a keyboard, a mouse, a touchscreen, a keypad, a biosensor, a compact disc (CD) drive, a digital versatile disc (DVD)

drive, or a floppy disk drive. The display interface 535 may include an interface configured to support a display, monitor, or screen. In some embodiments, the controller 500 comprises a graphical user interface to be displayed to a user over a monitor in order to allow the user to control the controller 500.

According to other embodiments, malicious network content may also include malicious portable document format (PDF) network content. It will be understood that the term "malicious PDF network content" may be understood to include portable document format (PDF) files located on one or more server devices 105 and made available for distribution via the communication network 120 to one or more client devices 110.

Generally speaking, the tap 115 may be adapted to intercept requests to obtain PDF network content received from a web browser, PDF reader application, or any other application, module, or engine requesting such PDF network content, associated with a client device 110. In some embodiments, the tap 115 may be disposed between one or more client devices 110 and one or more server devices 105 and direct requests to obtain PDF network content into the malicious network content detection system 600, which will be described in greater detail infra with reference to FIG. 6. It will be understood that the tap 115 may also be disposed between two or more server devices 105 and provide mechanisms for intercepting PDF network content exchanged between two or more server devices 105.

As background, PDF network content, such as a PDF document may include a fixed-layout document, that when parsed by a PDF reader application (not shown), produce a visual representation of the data included in the PDF document. The data within a PDF document is arranged in a hierarchical manner beginning with a header, a body portion that includes information indicative of one or more objects, a cross-reference table, also known as an "XREF" table, and a trailer. The header includes information indicative of the PDF specification version number to which the document adheres. The version number may be utilized to determine the PDF document reader version that is best adapted to parse the PDF document.

The XREF table includes offset information indicative of the position of objects within the PDF document. As such, the XREF table allows the PDF reader application to parse or walk individual portions (e.g., pages) of the PDF document without a need to parse or walk the entire PDF document. Lastly, the trailer of the PDF document allows the PDF reader application to efficiently locate the XREF table along with any other pertinent objects that may be utilized by the PDF reader application to construct the visual representation.

The body may contain one or more objects that comprise the contents of the PDF document. Generally speaking, the objects of a PDF document may include, but are not limited to, Boolean operators, numbers, names, strings, arrays, dictionaries, streams, and combinations thereof. The body may also include transparent objects such as metadata, security features, and the like.

Objects of a PDF document may be broadly categorized as either direct or indirect. It will be understood that direct objects may not reference other objects. Conversely, indirect object may make reference to one or more objects, which may include both direct and/or indirect objects. The PDF document may also include interactive elements such as AcroForm elements and XML Forms Data Format (XFDF elements). Both AcroForm and XFDF elements allow the inclusion of JavaScript code, also known as JavaScript API.

It will be understood that malware may be adapted to utilize JavaScript code to exploit vulnerabilities present within both PDF reader applications and web browser applications. It will further be understood that PDF reader applications and web browser applications may cooperate with one another via a plug-in. For example, when a web browser requests a PDF document, the PDF reader application is automatically launched to parse the PDF document. If the PDF document includes one or more objects that reference JavaScript code, the JavaScript codes called during parsing may construct virtual operating systems within the web browser for performing one or more functions associated with the JavaScript code.

While plug-in cooperation between the PDF reader application and web browser application provides significant benefits such as cross-platform compatibility (i.e., agnostic to the operating system of the client device 110), numerous vulnerabilities may be created within the web browser, which may expose the client device 110 to different types of malware, viruses, and the like.

In some embodiments, JavaScript code may exploit one or more vulnerabilities of the web browser application by loading memory allocated for operation of the PDF reader application with malicious code, often commonly referred to as "heap spray." The heap spray may be adapted to prepare the memory allocated for the PDF reader application with shellcode. Once prepared, the vulnerable JavaScript code is called to trigger the vulnerability, execute the shellcode, and ultimately deliver a payload. It will be understood that the term "payload" may include any deleterious effect caused by malicious network content to the client device 110. It is noteworthy that the deleterious effects caused by malicious network content are far too numerous to include individually, but would be readily appreciated by one of ordinary skill in the art with the present disclosure before them. Non-limiting examples of deleterious effects include consumption of memory, overwriting or corruption of system or program files, and the like.

As with HTML documents, suspicious characteristics indicative of malicious network content included with a PDF document may be determined by way of the heuristic module 130 as previously described supra with reference to FIG. 1. As such, the heuristics module 130 may utilize any one (or combination) of heuristic methodologies located with the heuristics database 135.

Figure 6:
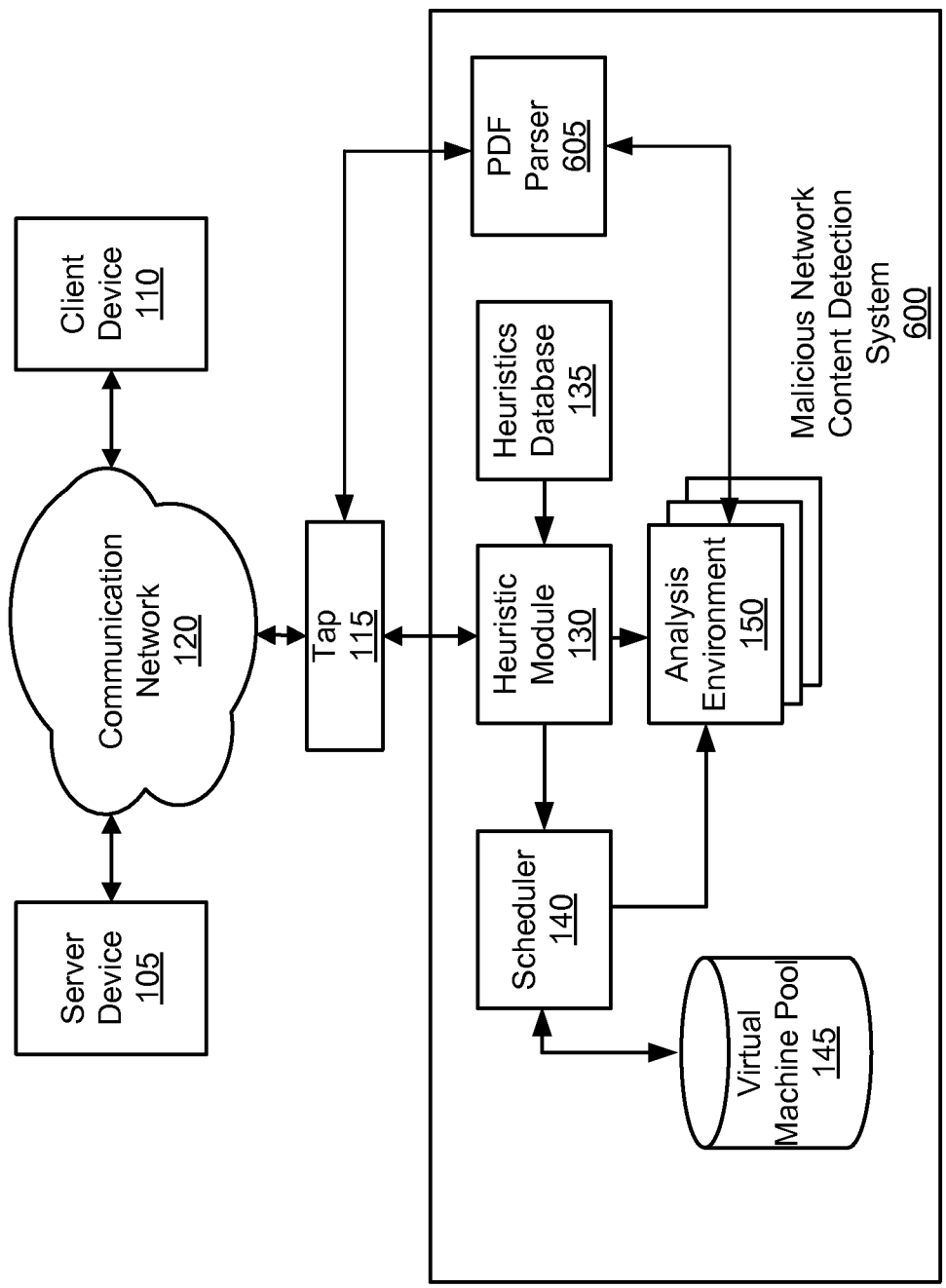
FIG. 6 illustrates an exemplary malicious PDF network content detection environment.

Referring now to FIG. 6, in some embodiments, suspicious characteristics indicative of malicious network content included with a PDF document may be determined by way of a malicious network content detection system 600. The malicious network content detection system 600 may include each of the components of malicious network content detection system 125 (see FIG. 1) along with one or more additional modules such as a PDF parser 605. The PDF parser 605 may be adapted to examine received (e.g., intercepted) PDF network content to determine if one or more suspicious characteristics indicative of malicious network content are included in the PDF network content. It will be understood that the term "examine" may be understood to include walking, parsing, inspecting, viewing, compiling, reading, extracting, decoding, and/or combinations thereof.

The malicious network content detection system 600 may be adapted to determine suspicious characteristics indicative of malicious network content by way of methods disclosed with regard to HTML files, such as the exemplary method 400 for detecting malicious network content described above with regard to FIG. 4. Additionally, the PDF parser 605 may be adapted to determine one or more suspicious characteristics indicative of malicious network content that are unique to PDF network content. For example, the PDF parser 605 may be adapted to examine the body of PDF network content to located objects that include specific types of JavaScript code. Some non-limiting examples of JavaScript code that are commonly utilized to exploit vulnerabilities in web browser applications include eval( ), util.printf( ), and media.newPlayer( ).

Moreover, creators of PDF network content malware may attempt to obfuscate JavaScript code references to malware by splitting the JavaScript code into a plurality of objects that when referenced by the PDF reader application may be combined to execute the malicious code. Therefore, the PDF parser 605 may be adapted to determine obfuscated malicious JavaScript code divided across multiple objects utilizing the getField( ) function.

In additional embodiments, the PDF parser 605 may be adapted to determine malicious JavaScript code that is encrypted in to PDF network content utilizing software stream ciphers such as RC4 and AES encryption.

While the above examples contemplate the adaptability of the PDF parser 605 to determine suspicious content such as JavaScript code, the PDF parser 605 may be adapted to determine additional types of malware associated with other objects including, but not limited to, embedded Flash stream objects. For example, a Flash file may include ActionScript virtual machine instructions that are adapted to set up a heap spray with shellcode. In an additional example, malicious code may be incorporated into the PDF network content via one or more Tagged Image File Format (TIFF) vulnerabilities. It will be understood that some TIFF vulnerabilities may not utilize heap spray functionalities.

While not an exclusive list, the following features may be indicative of PDF network content having malicious network content: PDFBadVersion (determines if the PDF specification version number associated with the PDF network content is correct), PDFHeader1_0 (examines the header information of the PDF network document for errors, also known as malformed header information), PDFNameJS (examines the PDF document for PDF objects that include names incorporating JS that are indicative of JavaScript code), PDFNameJavaScript (examines the PDF document for PDF objects that include names incorporating JavaScript that are indicative of JavaScript code), PDFBadFileStart (examines the PDF network content for an improper file start signature), PDFNameOpenAction (examines the PDF network content for PDF objects that cause Javascript functionality to be run on the initial loading of the PDF content), PDFCouldNotParse (determines if the PDF parser is unable to properly parse the PDF network content), and/or combinations thereof. The PDF parser 605 may utilize the aforementioned features to determine one or more suspicious characteristics included in the PDF network content.

It will be understood that because one or more portions (e.g., pages) of PDF network content may be assembled without need to walk or parse the entire PDF network content, the PDF parser 605 may be adapted to evaluate only the portion(s) of the PDF network content that has been requested by the client device 110.

Regardless of the type or amount of suspicious characteristics located by the PDF parser 605, if one or more suspicious characteristics are determined to be included in at least a portion of the PDF network content, the at least a portion of PDF network content may be provided to one or more virtual machines for verification of malicious network content.

The one or more virtual machines may be selected from the virtual machine pool 145 based, in part, upon the particular PDF specification version number included in the header of the PDF network content being analyzed. In some embodiments, the one or more virtual machines may each include one or more augmented finite state machines. Each of these augmented finite state machines may include different configurations of computer readable instructions such as operating system instructions, web browser instructions, PDF reader application instructions, plug-in instructions for operatively coupling one or more web browsers to a PDF reader application, along with any additional types of computer readable instructions adapted to verify the inclusion of malicious network content in PDF network content.

In some embodiments, the use of a plurality (i.e., two or more) of augmented finite state machines may allows for PDF network content to be processed across various system configurations (i.e., permutations of operating system instructions, web browser instructions, and PDF reader application instructions). As such, PDF network content that may not exploit vulnerabilities within one type of web browser application may be verified to exploit vulnerabilities within additional types of web browser applications. These types of multi-faceted analyses are more likely to verify the presence of malicious network content within PDF network content that exploit vulnerabilities of specific versions of programs and/or applications.

Each of the augmented finite state machines includes an analysis environment 150 to simulate the receipt, compiling, execution, and/or display of the PDF network content from the server device 105 to analyze the effects of the PDF network content upon the client device 110. For example, the analysis environment 150 may include a web browser requesting the PDF network content from a server device 105. The web browser causes the PDF reader application to parse the PDF network content. If the PDF network content does, in fact, include malicious code (e.g., JavaScript, Flash, etc.), one or more of the vulnerabilities of the web browser application or the PDF reader application may be exploited by the malicious code to deliver a payload. The effects of the payload may be directly or indirectly observed within the analysis environment 150.

It will be understood that an exemplary analysis environment 150 is described supra in greater detail with reference to FIG. 2 and may be adapted for observing the effects of parsing PDF network content determined to include one or more suspicious characteristics.

In some embodiments, the malicious network content detection system 600 may be further adapted to index PDF network content verified to include malicious network content by associating the PDF network content with an identifier indicative of one or more domains from which the PDF network content was obtained and storing the associated PDF network content as a record that resides with one or more databases operatively coupled to one or more server devices 105.

The database may be utilized by the malicious network content detection system 600 to compare PDF network content determined to include one or more suspicious characteristics to the index of PDF network content previously verified to include malicious network. Additionally, all PDF network documents residing on domains determined to have hosted PDF network content verified to include malicious network content may be automatically reviewed without further examination of the PDF network content for suspicious characteristics.

Figure 7:
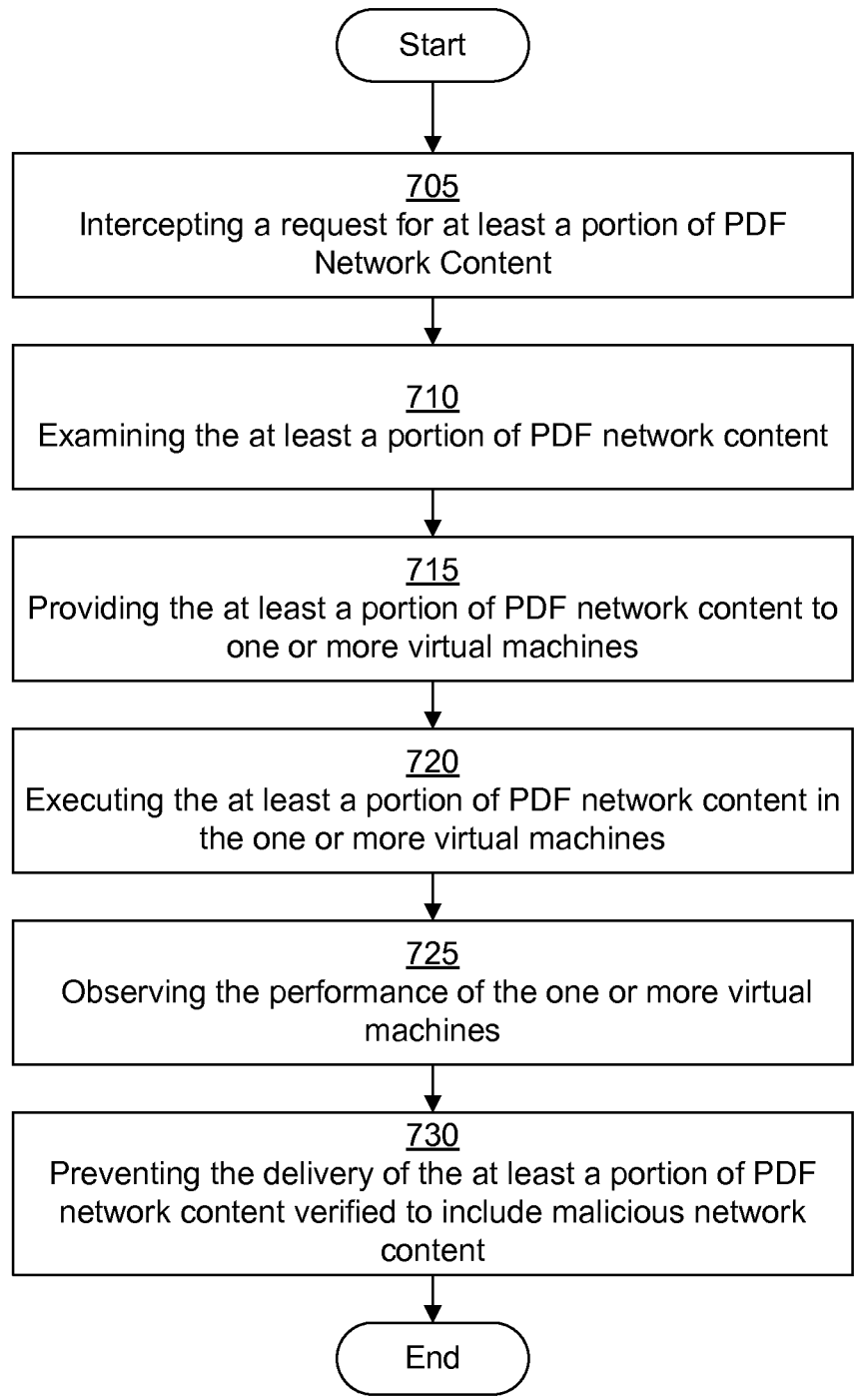
FIG. 7 illustrates an exemplary method for detecting malicious PDF network content.

Referring now to FIG. 7, an exemplary method 700 for detecting malicious PDF network content is shown. The method 700 may include the step 705 of intercepting a request for at least a portion of PDF network content via a tap 115 operatively associated therewith. It will be understood that the tap 115 may intercept the at least a portion of PDF network content before the at least a portion of PDF network is received by the web browser application.

Next, the method 700 may include the step 710 of examining the at least a portion of PDF network content to determine if one or more suspicious features and/or characteristics indicative of malicious network content are included in the at least a portion of PDF network content. As stated previously, examining may include utilizing heuristics or a PDF parser to determine the presence of specific features and/or specific vulnerable JavaScript code included with the at least a portion of PDF network content.

The method 700 may also include the step 715 of providing the at least a portion of PDF network content to one or more virtual machines (also known as augmented finite state machines).

Next, the inclusion of malicious network content in the at least a portion of PDF network content may be verified by executing or compiling the at least a portion of PDF network content in the one or more virtual machines in step 720. The compiling of the at least a portion of PDF network content causes vulnerable JavaScript code to execute any malicious network content associated therewith.

The method 700 then may include the step 725 of observing the performance of the one or more virtual machines to determine if the at least a portion of PDF network content, in fact, includes malicious network content. Observations of performance indicative of the execution of malicious network content include, but are not limited to the generation of heap spray within the memory allocated to the PDF reader application, the execution of shellcode, consumption of memory, overwriting or corruption of system or program files, and the like.

Lastly, the method 730 may include the step of preventing the delivery of the at least a portion of PDF network content verified to include malicious network to the client device from which the request was received.

The embodiments discussed herein are illustrative. As these embodiments are described with reference to illustrations, various modifications or adaptations of the methods and/or specific structures described may become apparent to those skilled in the art.

The above-described modules may be comprised of instructions that are stored on storage media (e.g., computer readable media). The instructions may be retrieved and executed by a processor (e.g., the processor 505). Some examples of instructions include software, program code, and firmware. Some examples of storage media comprise memory devices and integrated circuits. The instructions are operational when executed by the processor to direct the processor to operate in accordance with embodiments of the present invention. Those skilled in the art are familiar with instructions, processor(s), and storage media.

In the foregoing specification, the invention is described with reference to specific embodiments thereof, but those skilled in the art will recognize that the invention is not limited thereto. Various features and aspects of the above-described invention can be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method comprising:
adapting, by a digital device, a portable document format (PDF) parser, to evaluate a PDF document received over a network;
using the PDF parser to examine, by the digital device, one or more portions of the PDF document to determine if one or more suspicious characteristics indicative of malicious network content are included in the one or more examined portions of the PDF document, wherein the one or more examined portions of the PDF document comprise less than an entirety of the PDF document; and
when the one or more examined portions of the PDF document are determined to include one or more suspicious characteristics indicative of malicious network content, providing the PDF document to one or more virtual machines associated with the digital device to verify the inclusion of malicious network content in the one or more examined portions of the PDF document by processing at least the one or more examined portions of the PDF document by the one or more virtual machines so as to determine if the PDF document includes malicious network content.

2. The method of claim 1, wherein the examining further comprises:
determining a score associated with the one or more suspicious characteristics for the PDF document, the score indicative of a probability that the PDF document includes malicious network content; and
identifying the PDF document as suspicious if the score satisfies a threshold value.

3. The method of claim 2, wherein the score is determined by an approximate Bayesian probability analysis using a corpus of malicious network content and a corpus of non-malicious network content.

4. The method of claim 1, wherein a body portion of the PDF document is examined and the entirety of the PDF document is not examined prior to providing the PDF document to the one or more virtual machines.

5. The method of claim 4, wherein the examining the PDF document includes applying heuristics to determine if at least one suspicious characteristic indicative of malicious network content is included in the PDF document.

6. The method of claim 1, further comprising preventing the delivery of the PDF document verified to include malicious network content to a web browser application from which the delivery was requested.

7. The method of claim 1, wherein the examining of the one or more portions of the PDF document further comprises:
examining at least one of a header section or a body section of the PDF document; and
when the body section or the header section of the PDF document is determined to include one or more suspicious characteristics indicative of malicious network content, providing the PDF document to the one or more virtual machines associated with the digital device to verify the inclusion of malicious network content in the PDF document.

8. The method of claim 7, wherein the examining of the one or more portions of the PDF document further comprises examining Javascript code within the body section of the PDF document.

9. The method of claim 1, wherein the one or more virtual machines includes two or more augmented finite state machines, the two or more augmented finite state machines each including a configuration that includes at least one set of operating system instructions, at least one set of web browser instructions, and at least one set of PDF reader instructions, the configuration of each of the two or more augmented finite state machines being different from one another.

10. The method of claim 1, wherein the examining of the one or more portions of the PDF document further comprises:
   examining one or more of a header section, a body section, a trailer section, or a cross-reference table section of the PDF document; and
   providing the PDF document to the one or more virtual machines associated with the digital device to verify the inclusion of malicious network content in the PDF document when one or more of the body section, the header section, the trailer section or the cross-reference table section of the PDF document is determined to include one or more suspicious characteristics indicative of malicious network content.

11. The method of claim 1, wherein responsive to the one or more examined portions of the PDF document being determined to include one or more suspicious characteristics indicative of malicious network content, the method further comprising configuring the one or more virtual machines associated with the digital device based at least on data associated with the PDF document.

12. The method of claim 11, wherein the one or more virtual machines are configured based on one or more PDF specification version numbers of the PDF document.

13. The method of claim 12, wherein the one or more PDF specification version numbers of the PDF document identify a plurality of PDF reader applications.

14. A non-transitory computer readable storage medium storing information that, when executed by a processor cause a digital device to:
   adapt a portable document format (PDF) parser to evaluate a PDF document received over a network;
   parse the PDF document by the PDF parser, the parsed PDF document including a plurality of sections including a header section, a body section, a cross-reference table section and a trailer section;
   using the PDF parser, examine a subset of the plurality of sections of the PDF document to determine if one or more suspicious characteristics indicative of malicious network content are included in the subset of the plurality of sections of the PDF document, the subset of the plurality of sections is less than an entirety of the PDF document; and
   when any of the one or more examined sections included in the subset of the plurality of sections of the PDF document are determined to include one or more suspicious characteristics indicative of malicious network content, providing the PDF document to one or more virtual machines associated with the digital device to verify the inclusion of malicious network content in at least the subset of the plurality of sections of the PDF document.

15. The non-transitory computer readable storage medium of claim 14, wherein the examining further comprises:
   determining a score associated with the one or more suspicious characteristics for the PDF document, the score indicative of a probability that the PDF document includes malicious network content; and
   identifying the PDF document as suspicious if the score satisfies a threshold value.

16. The non-transitory computer readable storage medium of claim 15, wherein the score is determined by an approximate Bayesian probability analysis using a corpus of malicious network content and a corpus of non-malicious network content.

17. The non-transitory computer readable storage medium of claim 15, wherein the body section of the PDF document is examined while at least one section of the plurality of sections of the PDF document is not examined prior to providing the PDF document to the one or more virtual machines.

18. The non-transitory computer readable storage medium of claim 17, wherein the examining the subset of the plurality of sections of the PDF document includes applying heuristics to determine if at least one suspicious characteristic indicative of malicious network content is included in the subset of the plurality of sections of the PDF document.

19. The non-transitory computer readable storage medium of claim 14, wherein the one or more virtual machines includes two or more augmented finite state machines, the two or more augmented finite state machines each including a configuration that includes at least one set of operating system instructions, at least one set of web browser instructions, and at least one set of PDF reader instructions, the configuration of each of the two or more augmented finite state machines being different from one another.

20. The non-transitory computer readable storage medium of claim 14, further comprising associating the subset of the plurality of sections of the PDF document verified to include malicious network content with one or more domains from which the subset of the plurality of sections of the PDF document verified to include malicious network content was obtained, such that the one or more domains are a suspicious characteristic indicative of malicious network content.

21. The non-transitory computer readable storage medium of claim 14, further comprising preventing the delivery of the PDF document verified to include malicious network content to a web browser application from which the delivery was requested.

22. The non-transitory computer readable storage medium of claim 14, further comprising intercepting the PDF document before the examining of the PDF document.

23. The non-transitory computer readable storage medium of claim 14, wherein the subset of the plurality of sections of the PDF document comprises at least one and no more than three of the header section, the body section, the cross-reference table section and the trailer section of the PDF document.

24. The non-transitory computer readable storage medium of claim 14 further comprising configuring the one or more virtual machines associated with the digital device based on at least one or more PDF specification version numbers of the PDF document when any of the one or more examined sections included in the subset of the plurality of sections of the PDF document are determined to include one or more suspicious characteristics indicative of malicious network content.

25. The non-transitory computer readable storage medium of claim 24, wherein the one or more PDF specification version numbers of the PDF document include a first version number and a second version number, the first version number being different than the second version number.

26. The non-transitory computer readable storage medium of claim 24, wherein the one or more PDF specification version numbers of the PDF document identify a plurality of PDF reader applications.

27. The non-transitory computer readable storage medium of claim 24, wherein the one or more PDF specification version numbers of the PDF document are included in the header of the PDF document.

28. A non-transitory computer readable storage medium storing information that, when executed by a processor, cause a digital device to perform operations comprising:

adapt a portable document format (PDF) parser to evaluate a PDF document received over a network;

parse the PDF document by the PDF parser, the parsed PDF document including a plurality of sections including a header section, a body section, a cross-reference table section and a trailer section;

using the PDF parser, examine content associated with one or more sections of the plurality of sections of the PDF document to determine if one or more suspicious characteristics indicative of malicious network content are included in the one or more sections of the plurality of sections of the PDF document, wherein the one or more sections of the plurality of sections of the PDF document are less than an entirety of the PDF document; and when any of the one or more sections of the plurality of sections of the PDF document are determined to include one or more suspicious characteristics indicative of malicious network content, providing the PDF document to one or more virtual machines associated with the digital device to verify the inclusion of malicious network content in the one or more sections of the plurality of sections of the PDF document, wherein verification of the inclusion of the malicious network content comprises execution of a PDF reader application by the one or more virtual machines to process the content of each of the one or more sections of the plurality of sections of the PDF document so as to determine if the content includes malicious network content.

29. The non-transitory computer readable storage medium of claim 28, wherein the examining further comprises:

determining a score associated with the one or more suspicious characteristics for the PDF document, the score indicative of a probability that the PDF document includes malicious network content; and identifying the PDF document as suspicious if the score satisfies a threshold value.

30. The non-transitory computer readable storage medium of claim 29, wherein the score is determined by an approximate Bayesian probability analysis using a corpus of malicious network content and a corpus of non-malicious network content.

31. The non-transitory computer-readable storage medium of claim 29, wherein execution of the information by the processor causes the digital device to further perform operations comprising increasing at least one of a priority level and the score associated with the one or more suspicious characteristics associated with the content for the one or more sections of the plurality of sections of the PDF document when the PDF document includes more than one suspicious characteristic.

32. The non-transitory computer readable storage medium of claim 28, wherein the examining the content for the one or more sections of the plurality of sections of the PDF document includes applying heuristics to determine if at least one suspicious characteristic indicative of malicious network content is included in the content of the one or more sections of the plurality of sections of the PDF document.

33. The non-transitory computer readable storage medium of claim 28, wherein the one or more virtual machines includes two or more augmented finite state machines, the two or more augmented finite state machines each including a configuration that includes at least one set of operating system instructions, at least one set of web browser instructions, and at least one set of PDF reader instructions, the configuration of each of the two or more augmented finite state machines being different from one another.

34. The non-transitory computer readable storage medium of claim 28, wherein execution of the information by the processor causes the digital device to further perform operations comprising preventing the delivery of the PDF document verified to include malicious network content to a web browser application from which the delivery was requested.

35. The non-transitory computer readable storage medium of claim 28, wherein execution of the information by the processor causes the digital device to further perform operations comprising intercepting the PDF document propagating over the network before the examining of the content associated with the one or more sections of the plurality of sections of the PDF document.

36. The non-transitory computer readable storage medium of claim 28, wherein the one or more examined sections of the PDF document includes a body section of the PDF document.

37. A non-transitory computer readable storage medium storing information that, when executed by a processor cause a digital device to perform operations comprising:

adapt a portable document format (PDF) parser to evaluate a PDF document received over a network;

using the PDF parser, examine a subset of data forming the PDF document received over a network to determine if one or more suspicious characteristics indicative of malicious network content are included in the subset of the data of the PDF document, the subset of the data of the PDF document is less than an entirety of the PDF document; and responsive to the subset of the data of the PDF document being determined to include one or more suspicious characteristics indicative of malicious network content, (i) configuring one or more virtual machines associated with the digital device, and (ii) providing the subset of the data of the PDF document to the one or more virtual machines associated with the digital device to verify the inclusion of malicious network content in the subset of the data of the PDF document by processing the subset of the data of the PDF document by the one or more virtual machines so as to determine if the PDF document includes malicious network content.

38. The non-transitory computer readable storage medium of claim 37, wherein the examining of the subset of the data further comprises:

determining a score associated with the one or more suspicious characteristics for the PDF document, the score indicative of a probability that the PDF document includes malicious network content; and identifying the PDF document as suspicious if the score satisfies a threshold value.

39. The non-transitory computer readable storage medium of claim 38, wherein a body section of the subset of the data of the PDF document is examined while the entirety of the PDF document is not examined prior to providing the PDF document to the one or more virtual machines.

40. The non-transitory computer readable storage medium of claim 37, wherein the examining the subset of the data of the PDF document includes applying heuristics to determine if at least one suspicious characteristic indicative of malicious network content is included in the subset of the data of the PDF document.

41. The non-transitory computer readable storage medium of claim 37, wherein execution of the information by the processor causes the digital device to further perform operations comprising preventing the delivery of the subset of the data of the PDF document verified to include malicious network content to a web browser application from which the delivery was requested.

42. The non-transitory computer readable storage medium of claim 37, wherein the configuring the one or more virtual machines associated with the digital device is based on at least one or more PDF specification version numbers of the PDF document when the subset of the data of the PDF document is determined to include one or more suspicious characteristics.

43. The non-transitory computer readable storage medium of claim 42, wherein the one or more PDF specification version numbers of the PDF document include a first version number and a second version number, the first version number being different than the second version number.

44. The non-transitory computer readable storage medium of claim 42, wherein the one or more PDF specification version numbers of the PDF document identify a plurality of PDF reader applications.

45. The non-transitory computer readable storage medium of claim 37, wherein the examining of the subset of the data of the PDF document comprises examining contents of a body section of the PDF document.

46. A method comprising:
   adapting, by a digital device, a portable document format (PDF) parser, to evaluate a PDF document received over a network;
   using the PDF parser, parsing the PDF document, the parsed PDF document including a plurality of sections including a header section, a body section, a cross-reference table section and a trailer section, wherein the plurality of sections is less than an entirety of the PDF document;
   using the PDF parser, examining one or more sections of the plurality of sections of the PDF document to determine if one or more suspicious characteristics indicative of malicious network content are included in any of the one or more examined sections of the PDF document; and
   when any of the one or more examined sections of the PDF document are determined to include one or more suspicious characteristics indicative of malicious network content,
      (i) configuring one or more virtual machines associated with the digital device, and
      (ii) providing one or more examined sections of the PDF document determined to include the suspicious characteristics to the one or more virtual machines associated with the digital device to verify inclusion of malicious network content in the one or more examined sections of the PDF document.

47. The method of claim 46, wherein the examining of the one or more sections of the PDF document further comprises:
   determining a score associated with the one or more suspicious characteristics for the PDF document, the score indicative of a probability that the PDF document includes malicious network content; and
   identifying the PDF document as suspicious if the score satisfies a threshold value.

48. The method of claim 47, wherein the score is determined by an approximate Bayesian probability analysis using a corpus of malicious network content and a corpus of non-malicious network content.

49. The method of claim 47, further comprising increasing at least one of a priority level and the score associated with the one or more suspicious characteristics of the PDF document upon determining more than one suspicious characteristic are included within the PDF document.

50. The method of claim 46, wherein the examining the one or more sections of the PDF document includes examining at least a body section of the PDF document for suspicious characteristics without examining the entirety of the PDF document.

51. The method of claim 46, wherein the one or more virtual machines include two or more augmented finite state machines, the two or more augmented finite state machines each including a configuration that includes at least one set of operating system instructions, at least one set of web browser instructions, and at least one set of PDF reader instructions, the configuration of each of the two or more augmented finite state machines being different from one another.

52. The method of claim 46, further comprising associating the one or more examined sections of the PDF document verified to include malicious network content with one or more domains from which the one or more examined sections of the PDF document verified to include malicious network content was obtained, such that the one or more domains are a suspicious characteristic indicative of malicious network content.

53. The method of claim 46, further comprising preventing the delivery of the PDF document verified to include malicious network content to a web browser application from which the delivery was requested.

* * * * *